(12) United States Patent
Hori et al.

(10) Patent No.: US 12,133,128 B2
(45) Date of Patent: Oct. 29, 2024

(54) TERMINAL APPARATUS AND COMMUNICATION METHOD

(71) Applicant: Sharp Kabushiki Kaisha, Sakai (JP)

(72) Inventors: Takako Hori, Sakai (JP); Shohei Yamada, Sakai (JP); Hidekazu Tsuboi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 346 days.

(21) Appl. No.: 17/764,477

(22) PCT Filed: Sep. 29, 2020

(86) PCT No.: PCT/JP2020/036891
§ 371 (c)(1),
(2) Date: Mar. 28, 2022

(87) PCT Pub. No.: WO2021/065903
PCT Pub. Date: Apr. 8, 2021

(65) Prior Publication Data
US 2022/0345962 A1 Oct. 27, 2022

(30) Foreign Application Priority Data

Sep. 30, 2019 (JP) ................. 2019-179891

(51) Int. Cl.
*H04W 36/00* (2009.01)
*H04W 36/14* (2009.01)
*H04W 76/19* (2018.01)

(52) U.S. Cl.
CPC ..... *H04W 36/0079* (2018.08); *H04W 36/144* (2023.05); *H04W 76/19* (2018.02); *H04W 36/0022* (2013.01)

(58) Field of Classification Search
CPC ......... H04W 36/0055; H04W 36/0077; H04W 36/0079; H04W 36/08; H04W 36/12; H04W 36/305; H04W 76/10; H04W 76/19
See application file for complete search history.

(56) References Cited

U.S. PATENT DOCUMENTS 8,254,981 B2 * 8/2012 Dwyer ................. H04W 48/16
455/424
8,526,949 B2 * 9/2013 Dwyer ............. H04W 36/0061
455/435.2

(Continued)

FOREIGN PATENT DOCUMENTS

| JP | 2017-500829 A | 1/2017 |
| WO | 2018/128022 A1 | 7/2018 |

OTHER PUBLICATIONS

Official Communication issued in International Patent Application No. PCT/JP2020/036891, mailed on Dec. 28, 2020.

(Continued)

*Primary Examiner* — Alpus Hsu
(74) *Attorney, Agent, or Firm* — Keating & Bennett, LLP

(57) ABSTRACT

A terminal apparatus for communicating with a base station apparatus includes a receiver configured to receive, from the base station apparatus, a message indicating mobility from a first Radio Access Technology (RAT) to a second RAT, and a processing unit configured to attempt to select a cell. A requirement for the processing unit to attempt to select a cell in the second RAT in a case that processing of the mobility in accordance with the message fails is that establishment of a connection to the second RAT is not successful and first information is included in the message.

2 Claims, 9 Drawing Sheets

(56) References Cited

U.S. PATENT DOCUMENTS

| | | | | |
|---|---|---|---|---|
| 8,559,387 | B2* | 10/2013 | Dwyer | H04W 36/00835 |
| | | | | 370/335 |
| 8,842,633 | B2* | 9/2014 | Dwyer | H04W 36/0022 |
| | | | | 370/348 |
| 8,995,370 | B2* | 3/2015 | Pelletier | H04W 40/248 |
| | | | | 370/328 |
| 9,380,628 | B2* | 6/2016 | Pelletier | H04W 88/06 |
| 9,516,557 | B2* | 12/2016 | Zhu | H04W 36/00224 |
| 10,028,200 | B2* | 7/2018 | Pelletier | H04W 88/06 |
| 10,143,016 | B2* | 11/2018 | Marinier | H04W 72/0453 |
| 10,219,188 | B2* | 2/2019 | Chinthalapudi | H04L 9/40 |
| 10,412,660 | B2* | 9/2019 | Pelletier | H04W 76/15 |
| 10,750,411 | B2* | 8/2020 | Chinthalapudi | |
| | | | | H04W 36/00224 |
| 10,798,637 | B2* | 10/2020 | Pelletier | H04W 76/15 |
| 2013/0017805 | A1* | 1/2013 | Andre-Jonsson et al. | |
| | | | | H04W 36/0066 |
| | | | | 455/411 |
| 2016/0285716 | A1 | 9/2016 | Pelletier et al. | |
| 2019/0349906 | A1 | 11/2019 | Futaki et al. | |
| 2020/0112900 | A1* | 4/2020 | Huang-Fu | H04L 5/0055 |
| 2020/0137710 | A1* | 4/2020 | Surisetty | H04W 8/02 |

OTHER PUBLICATIONS

NTT Docomo, Inc., "New WID on New Radio Access Technology", RP-170855, 3GPP TSG RAN Meeting #75, Mar. 6-9, 2017, 8 pages.

"3rd Generation Partnership Project; Technical Specification Group Services and System Aspects; System Architecture for the 5G System; Stage 2 (Release 15)", 3GPP TS 23.501 V15.3.0, Sep. 2018, 1-226.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.6.0, Jun. 2019, 1-365.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.6.0, Jun. 2019, 1-960.

"3rd Generation Partnership Project; Technical Specification Group Radio Access Network; Evolved Universal Terrestrial Radio Access (E-UTRA); Packet Data Convergence Protocol (PDCP) specification (Release 15)", 3GPP TS 36.323 V15.3.0, Mar. 2019, 1-52.

"3rd Generation Partnership Project; Technical Specification Group Radio Access Network; Evolved Universal Terrestrial Radio Access (E-UTRA); Radio Link Control (RLC) protocol specification (Release 15)", 3GPP TS 36.322 V15.3.0, Sep. 2019, pp. 1-47.

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.6.0, Jun. 2019, pp. 1-133.

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.6.0, Jun. 2019, pp. 1-69.

"3rd Generation Partnership Project; Technical Specification Group Radio Access Network; NR; NR and NG-RAN Overall Description; Stage 2 (Release 15)", 3GPP TS 38.300 V15.6.0, Jun. 2019, pp. 1-99.

"3rd Generation Partnership Project; Technical Specification Group Radio Access Network; NR; Radio Resource Control (RRC) protocol specification (Release 15)", 3GPP TS 38.331 V15.6.0, Jun. 2019, pp. 1-519.

"3rd Generation Partnership Project; Technical Specification Group Radio Access Network; NR; Packet Data Convergence Protocol (PDCP) specification (Release 15)", 3GPP TS 38.323 V15.3.0, Sep. 2018, pp. 1-26.

"3rd Generation Partnership Project; Technical Specification Group Radio Access Network; NR; Radio Link Control (RLC) protocol specification (Release 15)", 3GPP TS 38.322 V15.3.0, Sep. 2018, pp. 1-33.

"3rd Generation Partnership Project; Technical Specification Group Radio Access Network; NR; Medium Access Control (MAC) protocol specification (Release 15)", 3GPP TS 38.321 V15.6.0, Jun. 2019, pp. 1-78.

"3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401 V15.0.0, Jun. 2017, pp. 1-386.

"3rd Generation Partnership Project; Technical Specification Group Services and System Aspects; Procedures for the 5G System; Stage 2 (Release 15)", 3GPP TS 23.502 V15.3.0, Sep. 2018, pp. 1-329.

"3rd Generation Partnership Project; Technical Specification Group Radio Access Network; E-UTRA and NR; Service Data Adaptation Protocol (SDAP) specification (Release 15)", 3GPP TS 37.324 V15.1.0, Sep. 2018, pp. 1-13.

T-Mobile, "5G Architecture Options—Full Set", Joint RAN/SA Meeting, RP-161266, Jun. 14, 2016, 11 pages.

* cited by examiner

```
<OMITTED>
RadioBearerConfig ::=              SEQUENCE {
  <PARTLY OMITTED>
  srb-ToAddModList                 SRB-ToAddModList          OPTIONAL,
  drb-ToAddModList                 DRB-ToAddModList          OPTIONAL,
  <PARTLY OMITTED>

SRB-ToAddModList ::= SEQUENCE (SIZE (1..2)) OF SRB-ToAddMod
SRB-ToAddMod ::= SEQUENCE {
  srb-Identity
  <PARTLY OMITTED>
  pdcp-Config                                                OPTIONAL,    -- Cond PDCP <PARTLY OMITTED>
DRB-ToAddModList ::= SEQUENCE (SIZE (1..maxDRB)) OF DRB-ToAddMod
DRB-ToAddMod ::= SEQUENCE {
  cnAssociation                    CHOICE {
    eps-BearerIdentity             INTEGER (0..15),          -- EPS-DRB-Setup
    sdap-Config                    SDAP-Config               -- 5GC
  }                                OPTIONAL,   -- Cond DRBSetup
  drb-Identity
  <PARTLY OMITTED>
  pdcp-Config                                                OPTIONAL,    -- Cond PDCP <PARTLY OMITTED>
DRB-Identity ::=                   INTEGER (1..32)
  <PARTLY OMITTED>
SDAP-Config ::=                    SEQUENCE {
  <PARTLY OMITTED>
  pdu-Session                      PDU-SessionID,
  mappedQoS-FlowsToAdd             SEQUENCE (SIZE (1..maxNrofQFIs)) OF QFI
  mappedQoS-FlowsToRelease         SEQUENCE (SIZE (1..maxNrofQFIs)) OF QFI

<OMITTED>
```

FIG. 7

```
<OMITTED>
RadioResourceConfigDedicated ::=      SEQUENCE {
    <PARTLY OMITTED>
    srb-ToAddModList                  SRB-ToAddModList
    drb-ToAddModList                  DRB-ToAddModList,
    <PARTLY OMITTED>
}
    <PARTLY OMITTED>

SRB-ToAddModList ::= SEQUENCE (size (1..2)) OF SRB-ToAddMod
    <PARTLY OMITTED>
SRB-ToAddMod ::= SEQUENCE {
    <PARTLY OMITTED>
    srb-Identity             INTEGER (1..2),
    pdcp-Config              PDCP-Config              OPTIONAL,
    <PARTLY OMITTED>
}
    <PARTLY OMITTED>

DRB-ToAddModList ::= SEQUENCE (size (1..maxQoSFlowID)) OF DRB-ToAddMod
DRB-ToAddMod ::= SEQUENCE {
    <PARTLY OMITTED>
    eps-BearerIdentity       INTEGER (0..15)          OPTIONAL,
    drb-Identity             DRB-Identity,
    pdcp-Config              PDCP-Config              OPTIONAL
    <PARTLY OMITTED>
}
    <PARTLY OMITTED>

DRB-Identity ::=             INTEGER (1..32)
    <OMITTED>
```

FIG. 8

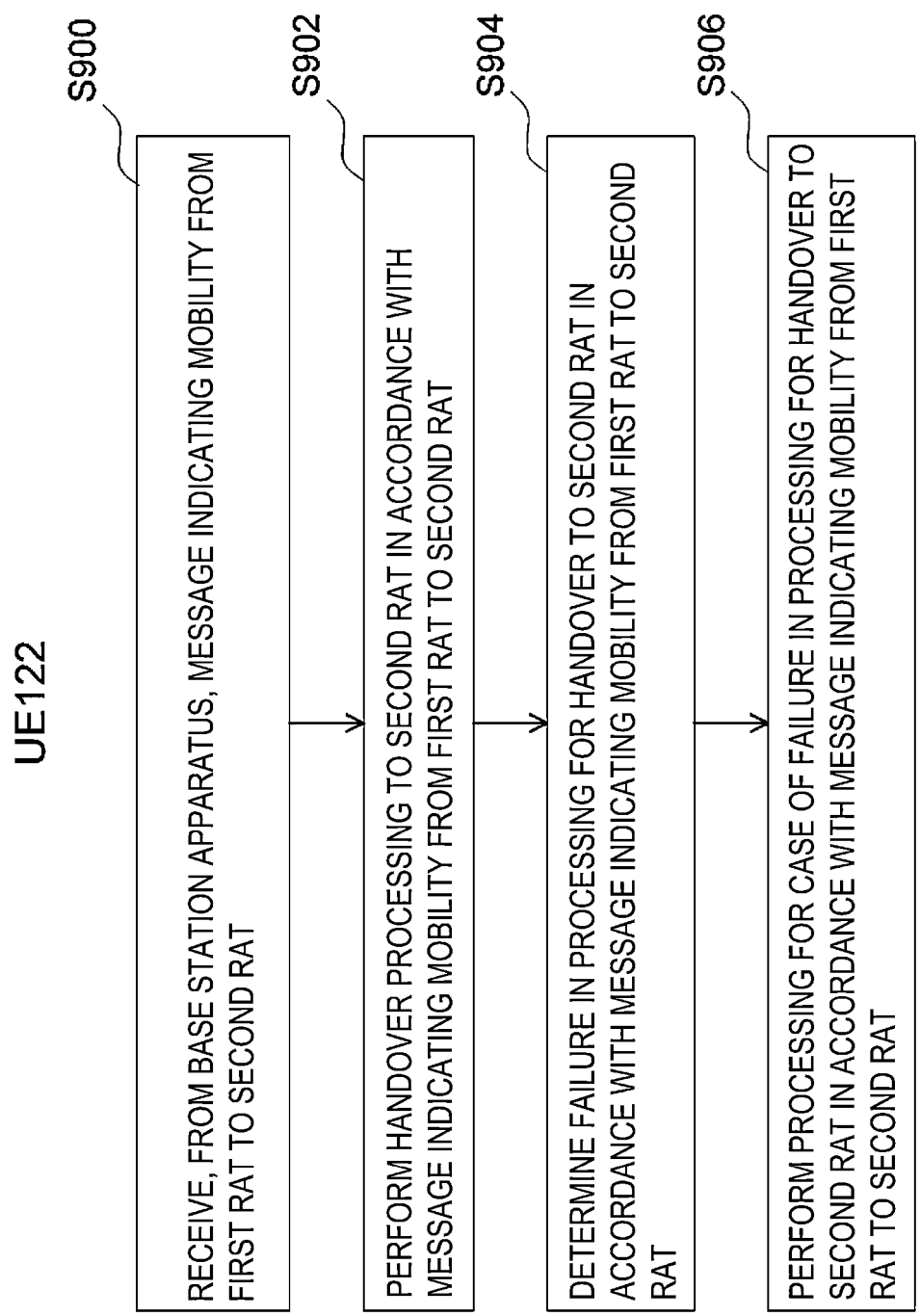

TERMINAL APPARATUS AND COMMUNICATION METHOD

TECHNICAL FIELD

The present invention relates to a terminal apparatus and a communication method.

This application claims priority based on JP 2019-179891 filed on Sep. 30, 2019, the contents of which are incorporated herein by reference.

A radio access method and a radio network for cellular mobile communications (which will hereinafter be referred to as "Long Term Evolution (LTE; trade name)" or "Evolved Universal Terrestrial Radio Access (EUTRA)") and a core network (which will be referred to as "Evolved Packet Core or EPC") have been studied by the 3rd Generation Partnership Project (3GPP).

Furthermore, as a radio access method and a radio network technology for a 5th generation cellular system, technical studies and standardization of LTE-Advanced Pro which is an enhanced technology of LTE and New Radio technology (NR) which is a new radio access technology have been conducted by the 3GPP (NPL 1). Furthermore, 5th Generation Core Network (5GC), which is a core network for the 5th generation cellular system, has also been studied (NPL 2).

CITATION LIST

Non Patent Literature

NPL 1: 3GPP RP-170855, "Work Item on New Radio (NR) Access Technology"
NPL 2: 3GPP TS 23.501 v15.3.0, "System Architecture for the 5G System; Stage 2"
NPL 3: 3GPP TS 36.300 v15.6.0, "Evolved Universal Terrestrial Radio Access (E-UTRA) and Evolved Universal Terrestrial Radio Access Network (E-UTRAN); Overall description; Stage 2"
NPL 4: 3GPP TS 36.331 v15.6.0, "Evolved Universal Terrestrial Radio Access (E-UTRA); Radio Resource Control (RRC); Protocol specifications"
NPL 5: 3GPP TS 36.323 v15.3.0, "Evolved Universal Terrestrial Radio Access (E-UTRA); Packet Data Convergence Protocol (PDCP) specification"
NPL 6: 3GPP TS 36.322 v15.3.0, "Evolved Universal Terrestrial Radio Access (E-UTRA); Radio Link Control (RLC) protocol specification"
NPL 7: 3GPP TS 36.321 v15.6.0, "Evolved Universal Terrestrial Radio Access (E-UTRA); Medium Access Control (MAC) protocol specification"
NPL 8: 3GPP TS 37.340v 15.6.0, "Evolved Universal Terrestrial Radio Access (E-UTRA) and NR; Multi-Connectivity; Stage 2"
NPL 9: 3GPP TS 38.300v 15.6.0, "NR; NR and NG-RAN Overall description; Stage 2"
NPL 10: 3GPP TS 38.331 v15.6.0, "NR; Radio Resource Control (RRC); Protocol specifications"
NPL 11: 3GPP TS 38.323 v15.3.0, "NR; Packet Data Convergence Protocol (PDCP) specification"
NPL 12: 3GPP TS 38.322 v15.3.0, "NR; Radio Link Control (RLC) protocol specification"
NPL 13: 3GPP TS 38.321 v15.6.0, "NR; Medium Access Control (MAC) protocol specification"
NPL 14: 3GPP TS 23.401 v15.0.0, "General Packet Radio Service (GPRS) enhancements for Evolved Universal Terrestrial Radio Access Network (E-UTRAN) access"
NPL 15: 3GPP TS 23.502 v15.3.0, "Procedure for 5G System; Stage 2"
NPL 16: 3GPP TS 37.324 v15.1.0, "NR; Service Data Adaptation Protocol (SDAP) Specification"
NPL 17: 3GPP RP-161266, "5G Architecture Options-Full Set"

SUMMARY OF INVENTION

Technical Problem

As a technical study of NR, studies have been conducted about an architecture in which E-UTRA connects to the 5GC, an architecture in which NR connects to the 5GC, an architecture related to a scheme in which cells in Radio Access Technologies (RATs) of both the E-UTRA and NR are grouped to form a cell group for each RAT and in which the resultant groups are allocated to UEs such that a terminal apparatus communicates with one or more base station apparatuses (Multi-RAT Dual Conductivity, Multi-Radio Dual Connectivity (MR-DC), and the like (NPL 17).

However, due to different formats and functions of communication protocols utilized in the respective architectures and different core networks utilized in the respective architectures, protocol processing is more complicated in mobility to a network with a different architecture with continued communication (handover) than in mobility within LTE in related art, preventing efficient communication between a base station apparatus and a terminal apparatus.

An aspect of the present invention has been made in light of the foregoing, and an object of the present invention is to provide a terminal apparatus that can efficiently communicate with a base station apparatus and a method used for the terminal apparatus.

Solution to Problem

In order to accomplish the object described above, an aspect of the present invention is contrived to provide the following measures. Specifically, a terminal apparatus for communicating with a base station apparatus includes a receiver configured to receive, from the base station apparatus, a message indicating mobility from a first Radio Access Technology (RAT) to a second RAT, and a processing unit configured to attempt to select a cell, wherein a requirement for the processing unit to attempt to select a cell in the second RAT in a case that processing of the mobility in accordance with the message fails is that establishment of a connection to the second RAT is not successful and first information is included in the message.

An aspect of the present invention provides a method for a terminal apparatus for communicating with a base station apparatus, the method including the steps of receiving, from the base station apparatus, a message indicating mobility from a first Radio Access Technology (RAT) to a second RAT, and attempting to select a cell, wherein a requirement for the terminal apparatus to attempt to select a cell in the second RAT in a case that processing of the mobility in accordance with the message fails is that establishment of a connection to the second RAT is not successful and first information is included in the message.

These comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

Advantageous Effects of Invention

According to one aspect of the present invention, the terminal apparatus can reduce the complexity of protocol processing and efficiently perform communication.

BRIEF DESCRIPTION OF DRAWINGS

FIG. 7 illustrates an example of an ASN.1 notation included in a message related to reconfiguration of RRC connection in NR according to an embodiment of the present invention.

FIG. 8 illustrates an example of an ASN.1 notation included in a message related to reconfiguration of RRC connection in E-UTRA according to an embodiment of the present invention.

FIG. 9 illustrates an example of a processing method of a UE 122 according to an embodiment of the present invention.

DESCRIPTION OF EMBODIMENTS

Hereinafter, an embodiment of the present invention will be described in detail with reference to the drawings.

LTE (and LTE-A Pro) and NR may be defined as different Radio Access Technologies (RATs). The NR may be defined as a technology included in the LTE. The LTE may be defined as a technology included in the NR. The LTE that is connectible to the NR by using Multi Radio Dual connectivity may be distinguished from the existing LTE. The LTE in which a 5GC is used as a core network may be distinguished from a conventional LTE, where an EPC is used as a core network. The present embodiment may be applied to the NR, the LTE and other RATs. Terms associated with the LTE and the NR are used in the following description. However, the present invention may be applied to other technologies using other terms. In the present embodiment, the term "E-UTRA" may be replaced with "LTE," and the term "LTE" may be replaced with "E-UTRA."

Figure 1:
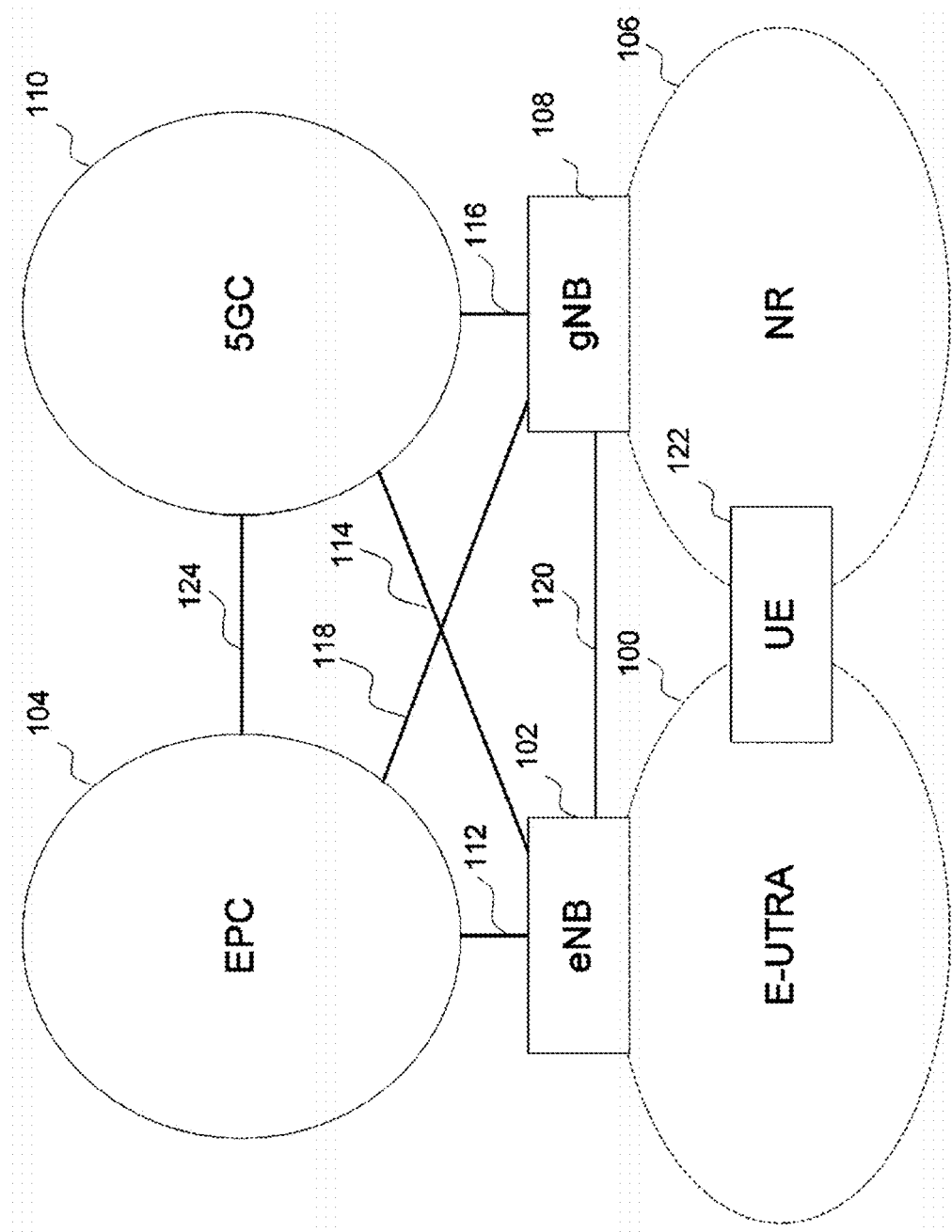
FIG. 1 is a schematic diagram of a communication system according to each embodiment of the present invention.

FIG. 1 is a schematic diagram of a communication system according to each embodiment of the present invention.

An E-UTRA 100 is a radio access technology described in NPL 3 or the like, and includes a cell group (CG) configured in one or multiple frequency bands. An E-UTRAN Node B (eNB) 102 is a base station apparatus of the E-UTRA 100. An Evolved Packet Core (EPC) 104 is a core network described in NPL 14 and the like and is designed as a core network for the E-UTRA 100. An interface 112 is an interface between the eNB 102 and the EPC 104, where there is a control plane (CP) through which control signals are transferred and a user plane (UP) through which user data is transferred.

An NR 106 is a radio access technology described in NPL 9 and the like, and includes a cell group (CG) including one or multiple frequency bands. A gNodeB (gNB) 108 is a base station apparatus in the NR 106. A 5GC 110 is a core network described in NPL 2 and the like, and is designed as a core network for the NR 106, but may also be used as a core network used for the E-UTRA 100 and including a function to connect to the 5GC 110. Hereinafter, the E-UTRA 100 may include the E-UTRA 100 including a function to connect to the 5GC 110.

The cell group described above may necessarily include one Special Cell (SpCell). The cell group described above may include one or multiple secondary cells different from the special cell. The special cell described above may be referred to as a Primary Cell (PCell). The special cell described above may be a cell involving configurations including some or all of configuration related to NAS, configuration related to security, configuration related to random access, configuration related to radio link, and configuration related to handover, which are described below. The secondary cell described above may be a cell lacking some or all of configuration related to NAS, configuration related to security, configuration related to random access, configuration related to radio link, and configuration related to handover, which are described below.

An interface 114 is an interface between the eNB 102 and the 5GC 110, an interface 116 is an interface between the gNB 108 and the 5GC 110, an interface 118 is an interface between the gNB 108 and the EPC 104, an interface 120 is an interface between the eNB 102 and the gNB 108, and an interface 124 is an interface between the EPC 104 and 5GC 110. The interface 114, the interface 116, the interface 118, the interface 120, the interface 124, and the like may be interfaces that allow a CP only, an UP only, or both the CP and UP to pass through. The interface 114, the interface 116, the interface 118, the interface 120, the interface 124, and the like may be absent depending on a communication system provided by a network operator.

A UE 122 is a terminal apparatus supporting one or all of the E-UTRA 100 and the NR 106. As described in one or all of NPL 3 and NPL 9, in a case that the UE 122 connects to a core network via one or all of the E-UTRA 100 and the NR 106, a logical path called a radio bearer (RB) is established between the UE 122 and one or all of the E-UTRA 100 and the NR 106. The radio bearer used for the CP is referred to as a Signaling Radio Bearer (SRB), and the radio bearer used for the UP is referred to as a Data Radio Bearer (DRB). Each RB is assigned an RB identity (or an RB ID) and uniquely identified. The RB identity for the SRB is referred to as an SRB identity (or an SRB ID), and the RB identity for the DRB is referred to as a DRB identity (or a DRB ID).

As described in NPL 3, in a case that a connection destination core network for the UE 122 is an EPC 104, each DRB established between the UE 122 and any or all of the E-UTRA 100 and the NR 106 is uniquely linked to each Evolved Packet System (EPS) bearer passing through the EPC 104. Each EPS bearer is assigned an EPS bearer identity (or ID), and uniquely identified. Additionally, identical QoS is ensured for data passing through an identical EPS bearer.

As described in NPL 9, in a case that a connection destination core network of the UE 122 is the 5GC 110, one or multiple DRBs established between the UE 122 and one or all of the E-UTRA 100 and the NR 106 are further linked to one of the Packet Data Unit (PDU) sessions established in the 5GC 110. One or multiple QoS flows are present in each PDU session. Each DRB may be mapped to one or multiple QoS flows present in the linked PDU session or to none of the QoS flows. Each PDU session is identified by a PDU session identity (or ID). Additionally, each QoS flow is identified by a QoS flow identity. Identical QoS is ensured for data passing through an identical QoS flow.

In the EPC 104, any of the PDU sessions and the QoS flows is absent or none of the PDU sessions and the QoS flows are present. No EPS bearers are present in the 5GC 110. In other words, in a case of being connected to the EPC 104, the UE 122 has information of the EPS bearers. In a case of being connected to the 5GC 110, the UE 122 has information of any or all of the PDU sessions and the QoS flows.

In the following description, the eNB 102 and/or the gNB 108 is simply referred to as a base station apparatus, and the UE 122 is also simply referred to as a terminal apparatus.

Figure 2:
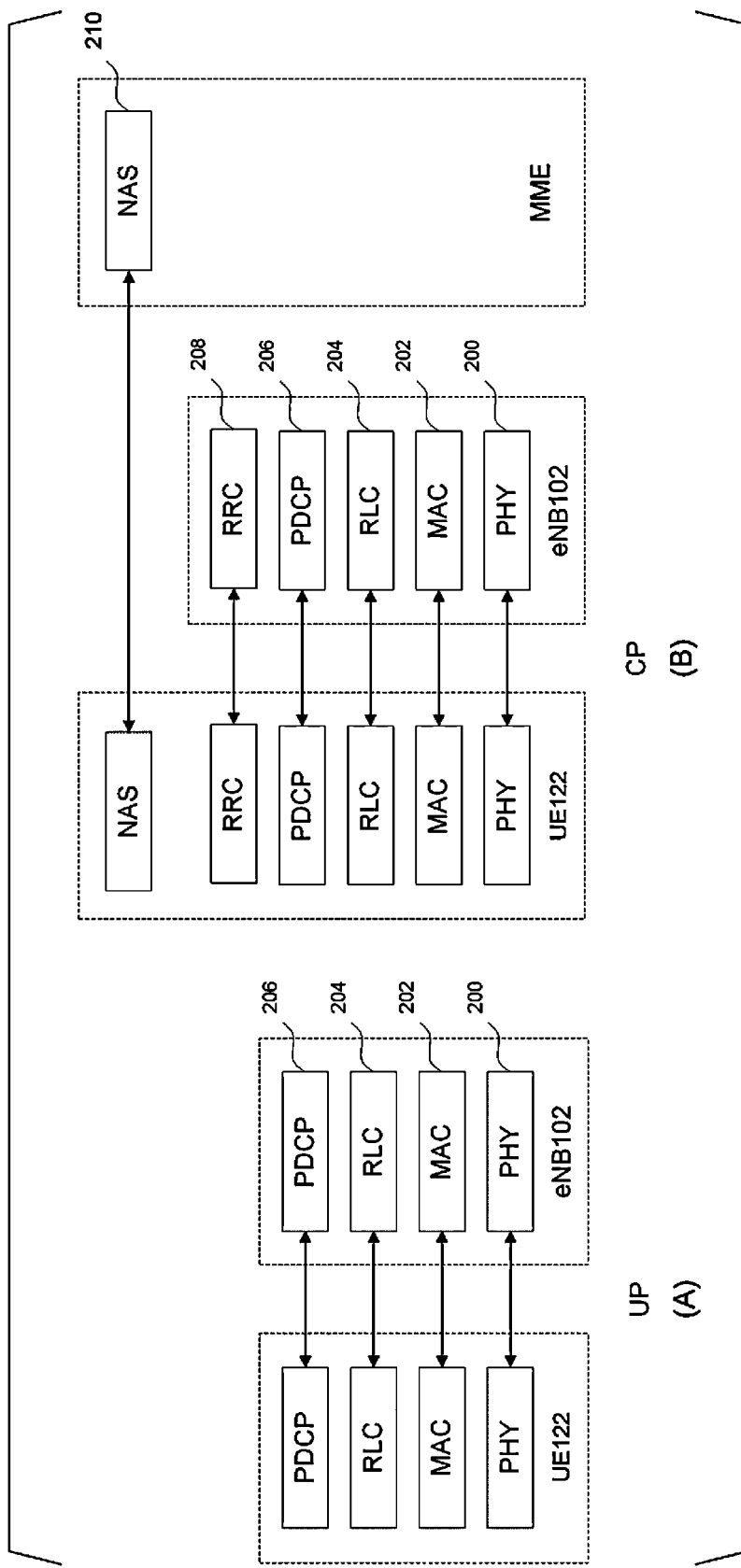
FIG. 2 is a diagram of protocol stacks of UP and CP of a terminal apparatus and a base station apparatus in E-UTRA according to each embodiment of the present invention.

FIG. 2 is a diagram of protocol stacks of UP and CP of a terminal apparatus and a base station apparatus in an E-UTRA radio access layer (access layer) according to each embodiment of the present invention.

FIG. 2(A) is a diagram of a protocol stack of the UP used in a case that the UE 122 communicates with the eNB 102 in the E-UTRA 100.

A Physical layer (PHY) 200 is a radio physical layer and provides a transmission service to an upper layer by using a physical channel. The PHY 200 is connected with a Medium Access Control layer (MAC) 202 of an upper layer to be described below via transport channels. Data is exchanged between the MAC 202 and the PHY 200 via the transport channels. The data is transmitted and/or received via radio physical channels between the PHYs of the UE 122 and the eNB 102.

The MAC 202 is a medium access control layer that maps various logical channels to various transport channels. The MAC 202 is connected with a radio link control layer (RLC) 204 of an upper layer to be described below via logical channels. The major classifications of the logical channel depend on the type of information to be transmitted, specifically, the logical channels are classified into control channels for transmitting control information and traffic channels for transmitting user information. The MAC 202 has a function of controlling the PHY 200 in order to perform the Discontinuous Reception and Transmission (DRX and DTX), a function of performing a random access procedure, a function of reporting transmit power information, a function of performing HARQ control, and the like (NPL 7).

An RLC 204 is a radio link control layer that segments data received from a Packet Data Convergence Protocol Layer (PDCP) 206 corresponding to an upper layer and described below, and adjusts the data size such that a lower layer can properly transmit the data. Furthermore, the RLC 200 also has a function of ensuring Quality of Service (QoS) required for each piece of data. In other words, the RLC 204 has a function of data retransmission control or the like (NPL 6).

The PDCP 206 is a packet data convergence protocol layer for efficiently transmitting user data such as IP packets in wireless sections. The PDCP 206 may include a header compression function to compress unnecessary control information. Furthermore, the PDCP 206 may also have a data encryption function (NPL 5).

Note that data processed in the MAC 202, the RLC 204, and the PDCP 206 are referred to as a MAC Protocol Data Unit (PDU), an RLC PDU, and a PDCP PDU, respectively. In addition, data delivered from an upper layer to the MAC 202, the RLC 204, and the PDCP 206 or data delivered therefrom to an upper layer are respectively referred to as a MAC Service Data Unit (SDU), an RLC SDU, and a PDCP SDU.

For distinction between PDCP PDUs for data and PDCP PDUs for control, PDCP PDUs may also be referred to as PDCP Data PDUs (PDCP DATA PDUs) and PDCP Control PDUs (PDCP CONTROL PDUs), respectively. For distinction between RLC PDUs for data and RLC PDUs for control, RLC PDUs may also be referred to as RLC Data PDUs (RLC DATA PDUs) and RLC Control PDUs (RLC CONTROL PDUs), respectively.

FIG. 2(B) is a protocol stack diagram of the CP used by the UE 122 in communicating with the eNB 102 and a Mobility Management Entity (MME) used as a logical node providing functions such as authentication and mobility management in the E-UTRA 100.

In the protocol stack of the CP, a Radio Resource Control layer (RRC) 208 and a non Access Strarum (NAS) 210 are present in addition to the PHY 200, the MAC 202, the RLC 204, and the PDCP 206. The RRC 208 is a radio link control layer that performs processing such as establishment, re-establishment, suspension, resumption, and the like of an RRC connection, reconfiguration of the RRC connection, for example, configuration of the radio bearer (RB) and the cell group such as establishment, change, or release, control of logical channels, transport channels, and physical channels, and the like, and further performs configuration of handover and measurement, and the like. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured between the RRCs 208 of the eNB 102 and the UE 122. In addition, a portion of the RB including the RLC 204 and the MAC 202 may be referred to as an RLC bearer (NPL 4). In contrast to the NAS layer carrying signals between the MME and the UE 122, some or all of the layers of the PHY 200, the MAC 202, the RLC 204, the PDCP 206, and the RRC 208 carrying signals and data between the UE 122 and the eNB 102 may be referred to as Access Strarum (AS) layers.

The functional classification of the MAC 202, the RLC 204, the PDCP 206, and the RRC 208 described above is an example, and some or all of the respective functions may not be implemented. Some or all of the functions of each layer may be included in another layer.

Note that an IP layer, a Transmission Control Protocol (TCP) layer, a User Datagram Protocol (UDP) layer, an application layer, and the like that are upper layers of the IP layer are upper layers of the PDCP layer (not illustrated). The RRC layer and the non Access Strarum (NAS) layer also correspond to upper layers of the PDCP layer (not illustrated). In other words, the PDCP layer is a lower layer than the RRC layer, the NAS layer, the IP layer, and the Transmission Control Protocol (TCP) layer, the User Datagram Protocol (UDP) layer, and the application layer that are higher than the IP layer.

Figure 3:
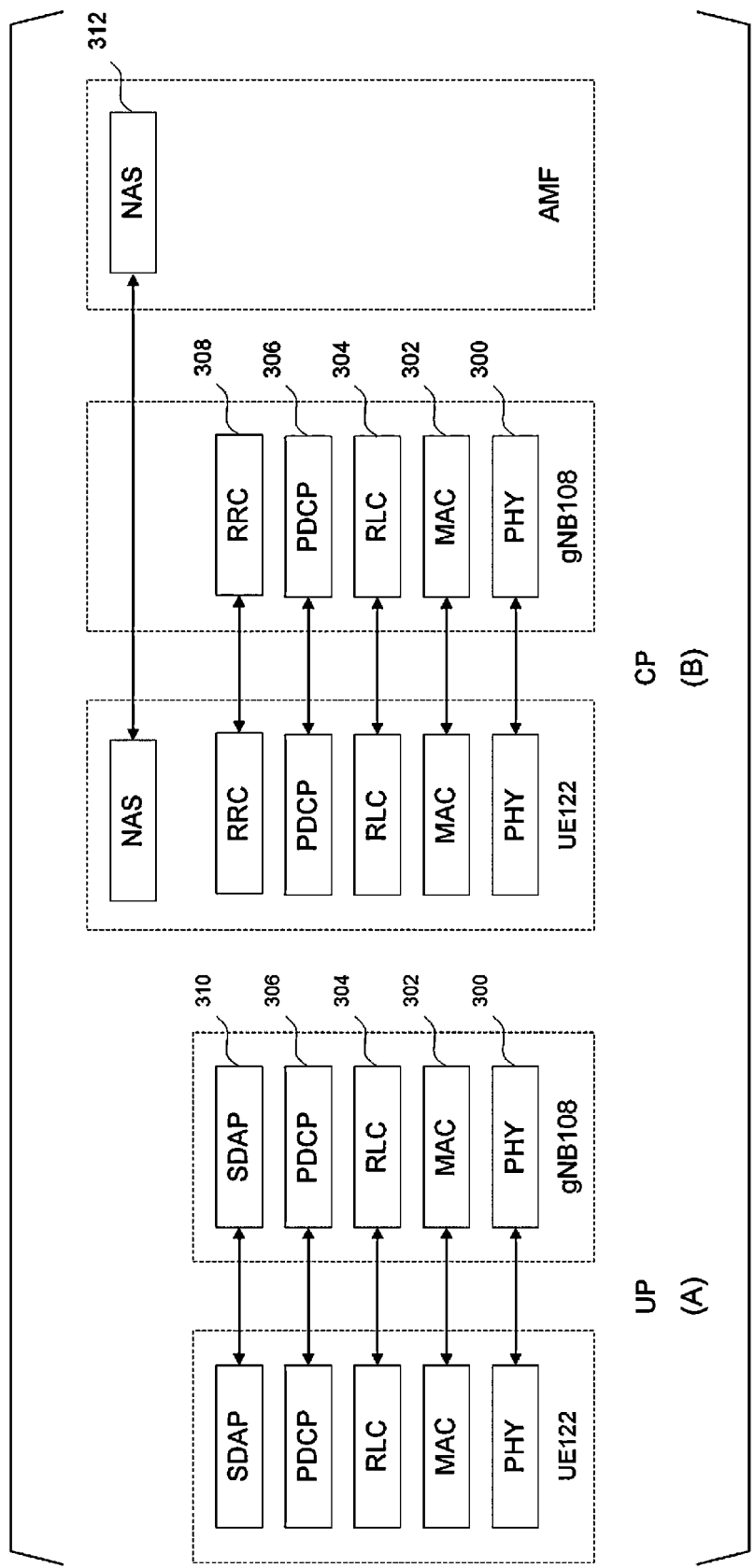
FIG. 3 is a diagram of protocol stacks of the UP and the CP of the terminal apparatus and the base station apparatus in NR according to each embodiment of the present invention.

FIG. 3 is a diagram of protocol stacks of UP and CP of a terminal apparatus and a base station apparatus in an NR radio access layer according to each embodiment of the present invention.

FIG. 3(A) is a diagram of the protocol stack of the UP used by the UE 122 in communicating with the gNB 108 in the NR 106.

A physical layer (PHY) 300 is a radio physical layer of the NR and may provide a transmission service to an upper layer by using a physical channel. The PHY 300 may be connected with the Medium Access Control layer (MAC) 302 of an upper layer to be described below via the transport channels. Data may be exchanged between the MAC 302 and the PHY 300 via the transport channels. The data may be transmitted and/or received between the PHYs of the UE 122 and the gNB 108 via the radio physical channel.

Now, the physical channels will be described.

The following physical channels may be used for the radio communication between the terminal apparatus and the base station apparatus.

Physical Broadcast CHannel (PBCH)
Physical Downlink Control CHannel (PDCCH)
Physical Downlink Shared CHannel (PDSCH)
Physical Uplink Control CHannel (PUCCH)
Physical Uplink Shared CHannel (PUSCH)
Physical Random Access CHannel (PRACH)

The PBCH is used to broadcast system information required by the terminal apparatuses.

The PBCH may be used to broadcast time indexes (SSB-Indexes) within the periodicity of synchronization signal blocks (also referred to as SS/PBCH blocks) in NR.

The PDCCH is used to transmit (or carry) downlink control information (DCI) in a case of downlink radio communication (radio communication from the base station apparatus 3 to the terminal apparatus). Here, one or multiple pieces of DCI (which may be referred to as DCI formats) are defined for transmission of the downlink control information. In other words, a field for the downlink control information is defined as DCI and is mapped to information bits. The PDCCH is transmitted in a PDCCH candidate. The terminal apparatus monitors a set of PDCCH candidates in the serving cell. The monitoring means an attempt to decode the PDCCH in accordance with a certain DCI format. The certain DCI format may be used for scheduling of the PUSCH in the serving cell. The PUSCH may be used for transmission of user data, transmission of RRC messages, and the like.

The PUCCH is used to transmit Uplink Control Information (UCI) in a case of uplink radio communication (radio communication from the terminal apparatus to the base station apparatus). Here, the uplink control information may include Channel State Information (CSI) used to indicate a downlink channel state. The uplink control information may include Scheduling Request (SR) used to request an UL-SCH resource. The uplink control information may include a Hybrid Automatic Repeat request ACKnowledgement (HARQ-ACK).

The PDSCH may be used to transmit downlink data (Downlink Shared CHannel (DL-SCH)) from the MAC layer. Furthermore, in a case of the downlink, the PDSCH is also used to transmit System Information (SI), a Random Access Response (RAR), and the like.

The PUSCH may be used to transmit uplink data (Uplink-Shared CHannel (UL-SCH)) from the MAC layer or to transmit the HARQ-ACK and/or CSI along with the uplink data. Furthermore, the PSCH may be used to transmit the CSI only or the HARQ-ACK and CSI only. In other words, the PSCH may be used to transmit the UCI only. The PDSCH or the PUSCH may be used to transmit RRC signaling (also referred to as RRC messages) and MAC control elements. In this regard, in the PDSCH, the RRC signaling transmitted from the base station apparatus may be signaling common to multiple terminal apparatuses in a cell. The RRC signaling transmitted from the base station apparatus may be dedicated signaling for a certain terminal apparatus (also referred to as dedicated signaling). In other words, terminal apparatus-specific (UE-specific) information may be transmitted through dedicated signaling to the certain terminal apparatus. Additionally, the PUSCH may be used to transmit UE capabilities in the uplink.

The PRACH may be used for transmitting a random access preamble. The PRACH may be used for indicating the initial connection establishment procedure, the handover procedure, the connection re-establishment procedure, synchronization (timing adjustment) for uplink transmission, and a request for a PUSCH (UL-SCH) resource.

The MAC 302 is a medium access control layer that maps various logical channels to various transport channels. The MAC 302 may be connected with a Radio Link Control layer (RLC) 304 of is a high layer to be described below via the logical channels. The classification of the logical channel depends on the type of information to be transmitted, and the logical channels may be classified into the control channels for transmitting the control information and the traffic channels for transmitting the user information. The MAC 302 may have a function of controlling the PHY 300 in order to perform the Discontinuous Reception and Transmission (DRX and DTX), a function of performing the random access procedure, a function of reporting the transmit power information, a function of performing the HARQ control, and the like (NPL 13).

The RLC 304 is a radio link control layer that segments data received from a Packet Data Convergence Protocol Layer (PDCP) 306 described below and corresponding to an upper layer and that adjusts the data size such that a lower layer can properly transmit the data. Furthermore, the RLC 304 may also have a function of ensuring Quality of Service (QoS) required for each piece of data. In other words, the RLC 304 may have a function of data retransmission control or the like (NPL 12).

The PDCP 306 is a packet data convergence protocol layer that efficiently transmits user data such as IP packets in wireless sections. The PDCP 306 may include a header compression function to compress unnecessary control information. Additionally, the PDCP 306 may also include a data ciphering function and a data integrity protection function (NPL 11).

A Service Data Adaptation Protocol (SDAP) 310 is a service data adaptation protocol layer that functions to map the DRB to a downlink QoS flow transmitted from the 5GC 110 to the terminal apparatus via the base station apparatus, and to map the DRB to an uplink QoS flow transmitted from the terminal apparatus to the 5GC 110 via the base station apparatus, and to store mapping rule information (NPL 16).

Note that the data processed in the MAC 302, the RLC 304, the PDCP 306, and the SDAP 310 are referred to as a MAC Protocol Data Unit (PDU), an RLC PDU, a PDCP PDU, and an SDAP PDU, respectively. Data delivered from an upper layer to the MAC 302, the RLC 304, the PDCP 306, and the SDAP 310 or data delivered therefrom to an upper layer are respectively referred to as a MAC Service Data Unit (SDU), an RLC SDU, a PDCP SDU, and an SDAP SDU.

For distinction between SDAP PDUs for data and SDAP PDUs for control, SDAP PDUs may also be referred to as SDAP Data PDUs (SDAP DATA PDUs) and SDAP Control PDUs (SDAP CONTROL PDUs), respectively. For distinction between PDCP PDUs for data and PDCP PDUs for control, PDCP PDUs may also be referred to as PDCP Data PDUs (PDCP DATA PDUs) and PDCP Control PDUs (PDCP CONTROL PDUs), respectively. For distinction between RLC PDUs for data and RLC PDUs for control, RLC PDUs may also be referred to as RLC Data PDUs (RLC DATA PDUs) and RLC Control PDUs (RLC CONTROL PDUs), respectively.

FIG. 3(B) is a protocol stack diagram of the CP used by the UE 122 in communicating with the gNB 108 and an Access and Mobility Management function (AMF) used as a logical node providing functions such as authentication and mobility management in the NR 106.

In the protocol stack of the CP, a Radio Resource Control layer (RRC) 308 and a non Access Strarum (NAS) 312 are present in addition to the PHY 300, the MAC 302, the RLC 304, and the PDCP 306. The RRC 308 is a radio link control layer that performs processing such as establishment, re-establishment, suspension, resumption, and the like of an RRC connection, reconfiguration of the RRC connection, for example, configuration of the radio bearer (RB) and the cell group such as establishment, change, or release, control of logical channels, transport channels, and physical channels, and the like, and further performs configuration of handover and measurement, and the like. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured between RRCs 308 of the gNB 108 and the UE 122. In addition, a portion of the RB including the RLC 304 and the MAC 302 may be referred to as an RLC bearer (NPL 10). In contrast to the NAS layer carrying signals between the AMF and the UE 122, some or all of the layers of the PHY 300, the MAC 302, the RLC 304, the PDCP 306, the RRC 308, and the SDAP 310 carrying signals and data between the UE 122 and the gNB 108 may be referred to as Access Strarum (AS) layers.

For the SRB, SRB0 to SRB3 described below may be defined. SRB0 may be an SRB used for an RRC message and using a Common Control CHannel (CCCH) corresponding to a logical channel SRB1 may be an SRB for the RRC message (which may include a piggybacked NAS message) and for the NAS message prior to the establishment of SRB2, and the Dedicated Control CHannel (DCCH) corresponding to a logical channel may be used for all cases. SRB2 may be an SRB for the NAS message, and the DCCH corresponding to a logical channel may be used for all cases. SRB2 may have a lower priority than SRB1. SRB3 may be an SRB for a particular RRC message in a case that the UE 122 is configured with EN-DC, NGEN-DC, NR-DC, or the like, and the DCCH corresponding to a logical channel may be used for all cases. Other SRBs may also be provided for other applications.

The functional classification of the MAC 302, the RLC 304, the PDCP 306, the SDAP 310, and the RRC 308 described above is an example, and some or all of the functions may not be implemented. Some or all of the functions of each layer may be included in another layer.

Note that an upper layer (not illustrated) of the AS layer may be referred to as a PDU layer, as described in NPL 2. The PDU layer may include any or all of an IP layer, a Transmission Control Protocol (TCP) layer and a User Datagram Protocol (UDP) layer that are upper layers of the IP layer, and other layers. The application layer may be an upper layer of the PDU layer or may be included in the PDU layer. Note that the PDU layer may be an upper layer with respect to the user plane of the AS layer. The RRC layer and the non Access Strarum (NAS) layer may be upper layers of one or all of the SDAP layer and the PDCP layer (not illustrated). In other words, one or all of the SDAP layer and the PDCP layer are lower layers of any or all of the RRC layer, the NAS layer, the IP layer, and the Transmission Control Protocol (TCP) layer, the User Datagram Protocol (UDP) layer, the Ethernet layer, and the application layer that are upper layers of the IP layer.

Note that, in each embodiment of the present invention, any or all of the following may belong to the application layer: a Session Initiation Protocol (SIP), a Session Description Protocol (SDP), and the like used for Internet Protocol (IP) Multimedia Subsystem (IMS); a Real-time Transport Protocol (RTP), a Real-time Transport Control Protocol (RTCP), a HyperText Transfer Protocol (HTTP), and the like used for media communication or media communication control; and codecs of various media and the like.

Note that the RRC layer of the terminal apparatus may perform any or all of establishment, configuration, and control on the physical layer, the MAC layer, the RLC layer, the PDCP layer, and the SDAP layer of the terminal apparatus. The RRC layer of the terminal apparatus may establish and/or configure the physical layer, the MAC layer, the RLC layer, the PDCP layer, and the SDAP layer in accordance with the RRC message transmitted from the RRC layer of the base station apparatus. The MAC layer, the RLC layer, the PDCP layer, and the SDAP layer may respectively be referred to as a MAC sublayer, an RLC sublayer, a PDCP sublayer, and a SDAP sublayer.

Note that an entity may refer to each of the layers belonging to the AS layer configured for one or all of the terminal apparatus and the base station apparatus or the function of each layer. Specifically, the MAC layer, the RLC layer, the PDCP layer, the SDAP layer, and the RRC layer configured for one or all of the terminal apparatus and the base station apparatus, or the functions of the respective layers may be referred to as a MAC entity, an RLC entity, a PDCP entity, an SDAP entity, and an RRC entity. One or multiple entities may be included in each layer. Any or all of establishment, configuration, and control may be performed on the PDCP entity and the RLC entity for each radio bearer. Any or all of establishment, configuration, and control may be performed on the MAC entity for each cell group. Any or all of establishment, configuration, and control may be performed on the SDAP entity for each PDU session.

Note that a COUNT value may be used in a case that processing for ciphering or integrity protection is performed in the PDCP layer or the PDCP entity. The COUNT value may include a Hyper Frame Number (HFN) and a Sequence Number (SN) added to the header of the PDCP PDU. The sequence number may be incremented by one each time a PDCP DATA PDU is generated by the PDCP layer or PDCP entity on the transmission side. The HFN may be incremented by one each time the sequence number reaches the maximum value.

Note that in each embodiment of the present invention, for a distinction between the E-UTRA protocol and the NR protocol, the MAC 202, the RLC 204, the PDCP 206, and the RRC 208 may be respectively referred to as a MAC for E-UTRA or a MAC for LTE, an RLC for E-UTRA or an RLC for LTE, a PDCP for E-UTRA or a PDCP for LTE, and an RRC for E-UTRA or an RRC for LTE. Furthermore, the MAC 302, the RLC 304, the PDCP 306, and the RRC 308 may also be referred to as MAC for NR, RLC for NR, RLC for NR, and RRC for NR, respectively. Alternatively, there may be descriptions using a space such as an E-UTRA PDCP or an LTE PDCP, an NR PDCP, and the like.

As also illustrated in FIG. 1, the eNB 102, the gNB 108, the EPC 104, and the 5GC 110 may be connected to one another via the interface 112, the interface 116, the interface 118, the interface 120, and the interface 114. Thus, the RRC 208 in FIG. 2 may be replaced with the RRC 308 in FIG. 3 to support various communication systems. Furthermore, the PDCP 206 in FIG. 2 may also be replaced with the PDCP 306 in FIG. 3. Furthermore, the RRC 308 in FIG. 3 may include the function of the RRC 208 in FIG. 2. Furthermore, the PDCP 306 in FIG. 3 may be the PDCP 206 in FIG. 2. In the E-UTRA 100, the NR PDCP may be used as a PDCP even in a case that the UE 122 communicates with the eNB 102.

The state transition of the UE 122 in LTE and NR will now be described. The UE 122 connected to the EPC may be in an RRC_CONNECTED state in a case that an RRC connection has been established. The UE 122 may be in an RRC_INACTIVE state in a case that the RRC connection is suspended (in a case that the UE 122 is connected to the 5GC). In the other cases, the UE 122 may be in an RRC_IDLE state.

Note that the UE 122 connected to the EPC does not have the RRC_INACTIVE state but that the E-UTRAN may initiate suspension of the RRC connection. In this case, in response to suspension of the RRC connection, the UE 122 transitions to the RRC_IDLE state while retaining an AS context of the UE and an identity used for resumption (resumeIdentity). In a case that the UE 122 retains the AS context of the UE and that the E-UTRAN permits the RRC connection to be resumed and that the UE 122 needs to transition from the RRC_IDLE state to the RRC_CONNECTED state, the resumption of the RRC connection suspended may be initiated by the upper layer (e.g., the NAS layer).

In other words, the definition of the suspension may vary between the UE 122 connected to the EPC and the UE 122 connected to the 5GC. All or part of the procedure for resuming the connection suspended may vary between a case where the UE 122 is connected to the EPC (the connection is suspended in the RRC_IDLE state) and a case where the UE 122 is connected to the 5GC (the connection is suspended in the RRC_INACTIVE state).

Note that the RRC_CONNECTED state, the RRC_INACTIVE state, and the RRC_IDLE state may be respectively referred to as a connected mode, an inactive mode, and an idle mode.

The AS context of the UE retained by the UE 122 may be information including all or some of a current RRC configuration, a current security context, a PDCP state including a RObust Header Compression (ROHC) state, a Cell Radio Network Temporary Identifier (C-RNTI) used in a PCell of a connection source, a cell identity (cellIdentity), and a physical cell identity of the PCell of the connection source. Note that the AS context of the UE retained by one or all of the eNB 102 and the gNB 108 may include information identical to the information of the AS context of the UE retained by the UE 122, or may include information different from the information included in the AS context of the UE retained by the UE 122.

The security context may be information including all or some of a ciphering key at the AS level, a Next Hop parameter (NH), a Next Hop Chaining Counter parameter (NCC) used to derive an access key for the next hop, an identifier of a ciphering algorithm at a selected AS level, and a counter used for replay protection.

Figure 4:
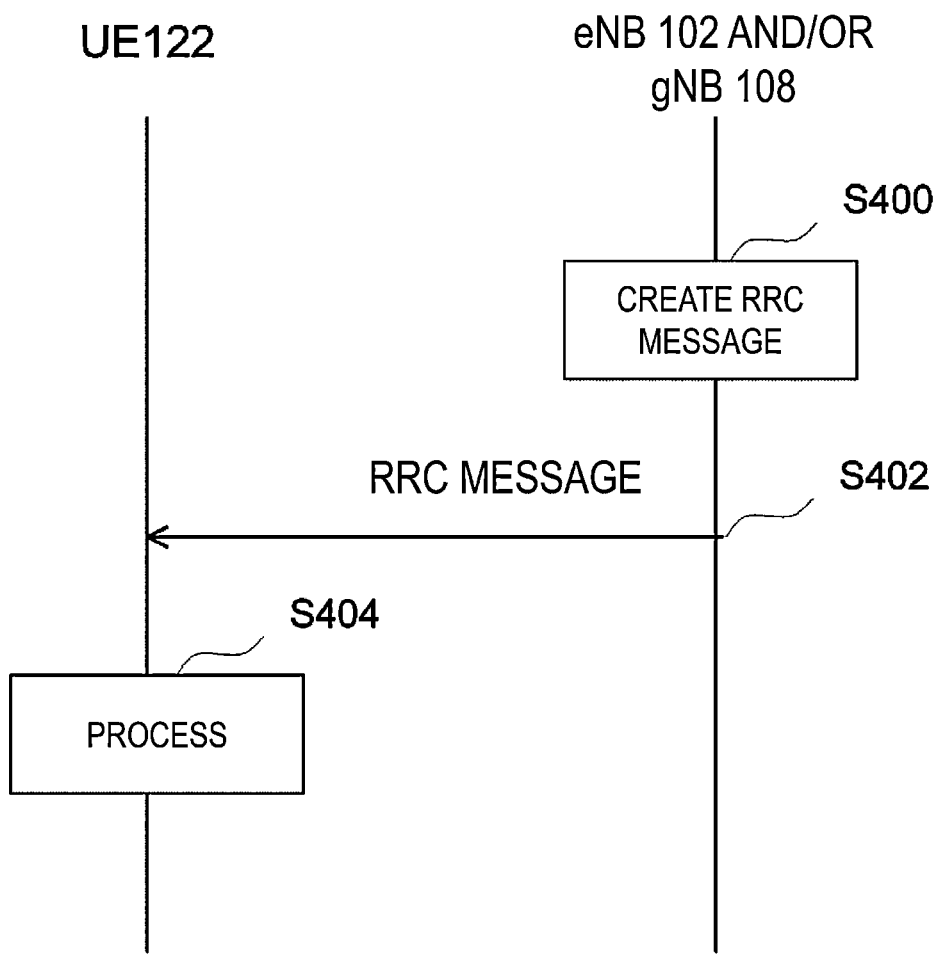
FIG. 4 is a diagram illustrating an example of a flow of a procedure for various configurations in an RRC 208 and/or an RRC 308 according to each embodiment of the present invention.

FIG. 4 is a diagram illustrating an example of a flow of a procedure for various configurations in the RRC 208 and/or the RRC 308 according to each embodiment of the present invention. FIG. 4 is an example of a flow in a case that an RRC message is sent from the base station apparatus (eNB 102 and/or gNB 108) to the terminal apparatus (UE 122).

In FIG. 4, the base station apparatus creates an RRC message (step S400). The creation of the RRC message in the base station apparatus may be performed in a case that the base station apparatus distributes broadcast information (System Information (SI)) or paging information, or in a case that the base station apparatus determines a need to cause a particular terminal apparatus to perform processing, for example, configuration related to security, reconfiguration of an RRC connection (processing (establishment, change, release, or the like) of the radio line bearer, processing (establishment, addition, change, release, or the like) of the cell group, measurement configuration, handover configuration, or the like), release of the RRC connected state, or the like. Additionally, the RRC message may be used for a command for handover to a different RAT. The RRC message includes information (parameters) for various information notifications and configurations. In specifications related to RRC in NPL 4, NPL 10, or the like, the above-described parameters are referred to as fields and/or information elements, and are notated by using a notation method referred to as Abstract Syntax Notation One (ASN.1).

In FIG. 4, the base station apparatus then transmits the RRC message created, to the terminal apparatus (step S402). Then, in a case that processing such as a configuration is necessary in accordance with the RRC message received, the terminal apparatus performs the processing (step S404).

Note that the creation of the RRC message is not limited to the example described above, and may be performed for other purposes, as described in NPL 4, NPL 10, and the like.

For example, the RRC message may be used for configuration related to Dual Connectivity (DC) or Multi-Radio Dual Connectivity (MR-DC) described in NPL 8.

The Dual Connectivity (DC) may be a technology for performing data communication by using radio resources of both cell groups including a master cell group (MCG) including master nodes (MNs) and a secondary cell group (SCG) including secondary nodes (SNs), each cell group including two base station apparatuses (nodes). The master node and the secondary node may be an identical node (identical base station apparatus). Furthermore, the MR-DC described in NPL 8 may be a technology in which cells of both Radio Access Technologies (RATs) of E-UTRA and NR are formed into cell groups for each RAT, which are assigned to the UE, and in which data communication is performed by utilizing radio resources of both MCG and SCG. In the MR-DC, the master node may be a base station including primary RRC functions related to MR-DC, for example, functions to add a secondary node, to establish, change, and release an RB, to add, change, and release an MCG, and to perform handover and the like, and the secondary base station may be a base station including some RRC functions, for example, functions to change and release an SCG, and the like. The special cell in the master cell group may be referred to as a primary cell, and the special cell in the secondary cell group may be referred to as a primary SCG cell (Primary SCG Cell: PSCell).

In the MR-DC described in NPL 8, the RRC corresponding to the master node side RAT may be used to configure both the MCG and the SCG. For example, in E-UTRA-NR Dual Connectivity (EN-DC) corresponding to the MR-DC in which the EPC 104 is used as a core network and the eNB 102 (also referred to as an evolved eNB 102) is used as a master node and in NG-RAN E-UTRA-NR Dual Connectivity (NGEN-DC) corresponding to the MR-DC in which the 5GC 110 is used as a core network and the eNB 102 is used as a master node, an RRC message for E-UTRA described in NPL 4 may be transmitted and received between the eNB 102 and the UE 122. In this case, the RRC message may include NR configuration information described in NPL 10 as well as LTE (E-UTRA) configuration information. Additionally, the RRC message transmitted from the eNB 102 to the UE 122 may be transmitted from the eNB 102 to the UE 122 via the gNB 108. The configuration of the present RRC message may be used in E-UTRA/5GC (option 5 described in NPL 17) corresponding to non-MR-DC in which the eNB 102 (evolved eNB) uses the 5GC as a core network.

Additionally, in contrast, in the MR-DC described in NPL 8, in NR-E-UTRA Dual Connectivity (NE-DC) corresponding to the MR-DC in which the 5GC 110 is used as a core network and the gNB 108 is used as a master node, an RRC message for NR described in NPL 10 may be transmitted and received between the gNB 108 and the UE 122. In this case, the RRC message may include LTE (E-UTRA) configuration information described in NPL 4 as well as NR configuration information. Additionally, the RRC message transmitted from the gNB 108 to the UE 122 may be transmitted from the gNB 108 to the UE 122 via the eNB 102.

Note that the embodiment is not limited to the case of utilization of the MR-DC and that the RRC message for E-UTRA transmitted from the eNB 102 to the UE 122 may include an RRC message for NR, whereas or the RRC message for NR transmitted from the gNB 108 to the UE 122 may include an RRC message for E-UTRA.

A network configuration in which the eNB 102 is used as a master node and the EPC 104 is used as a core network may be referred to as E-UTRA/EPC. Additionally, a network configuration in which the eNB 102 is used as a master node and the 5GC 110 is used as a core network may be referred to as E-UTRA/5GC. In addition, a network configuration in which the gNB 108 is used as a master node and the 5GC 110 is used as a core network may be referred to as NR or NR/5GC. Moreover, this designation need not be limited to a case where the DC is configured. in the case that the DC is not configured, the above-described master node may refer to a base station apparatus that communicates with the terminal apparatus.

FIG. 7 illustrates an example of an ASN.1 notation representing one or all of a field and an information element related to a radio bearer configuration included in a message related to reconfiguration of RRC connection in NR in FIG. 4. FIG. 8 illustrates an example of an ASN.1 notation representing one or all of a field and an information element related to a radio bearer configuration included in a message related to reconfiguration of RRC connection in E-UTRA in FIG. 4. Not only in FIG. 7 and FIG. 8 but also in examples of ASN.1 in an embodiment of the present invention, <omitted> and <partly omitted> are not part of the ASN.1 notation and indicates that other information is omitted. Note that there may also be omitted information elements in a part where neither <omitted> nor <partly omitted> is indicated. Note that the examples of ASN.1 according to an embodiment of the present invention do not correctly comply with the ASN.1 notation but represent examples of parameters in a message related to reconfiguration of RRC connection according to an embodiment of the present invention and that any other designation and any other notation may be used. The examples of ASN.1 according to an embodiment of the present invention correspond to only examples related to main information closely associated with an aspect of the present invention in order to avoid complicated description. Note that, in an embodiment of the present invention, the parameters notated in ASN.1 may all be referred to as information elements without distinction between fields, information elements, or the like. In an embodiment of the present invention, the parameters such as fields and information elements notated in ASN.1, the parameters being included in the RRC message, may also be referred to as information. Note that the message related to reconfiguration of RRC connection may be an RRC reconfiguration message in NR or an RRC connection reconfiguration message in E-UTRA.

In FIG. 7, the information element represented by RadioBearerConfig is an information element related to configurations of radio bearers such as SRBs or DRBs and include PDCP configuration information elements and SDAP configuration information elements to be described later. An information element represented by SRB-ToAddMod and included in the information elements represented by RadioBearerConfig may be information indicating a signaling radio bearer (SRB) configuration, and may also be referred to as an SRB configuration information element or a signaling radio bearer configuration information element. An information element represented by SRB-ToAddModList may be a list of pieces of information indicating SRB configurations. An information element represented by DRB-ToAddMod and included in the information elements represented by RadioBearerConfig may be information indicating a data radio bearer (DRB) configuration, and may also be referred to as a DRB configuration information element or a data radio bearer configuration information element. An information element represented by DRB-ToAddModList may be a list of pieces of information indicating DRB configurations. Note that any or all of the SRB configurations and the DRB configurations may be referred to as radio bearer configurations.

An information element included in the SRB configuration information elements and represented by SRB-Identity is information of SRB identity of an SRB to be added or changed, and may be an identifier that uniquely identifies the SRB at each terminal apparatus. This information element may be replaced with an SRB identity information element, a radio bearer identity information element, or a signaling radio bearer identity information element.

An information element included in the DRB configuration information elements and represented by DRB-Identity is an information of DRB identity of a DRB to be added or changed, and may be an identifier that uniquely identifies the DRB at each terminal apparatus. This information element may be replaced with a DRB identity information element, a radio bearer identity information element, or a data radio bearer identity information element. In the example illustrated in FIG. 7, the DRB identity has an integer value ranging from 1 to 32. However, the DRB identity may take another value. For DC, the DRB identity is unique within the scope of the UE 122.

An information element included in the DRB configuration information elements and represented by cnAssociation may be an information element indicating whether the EPC 104 or the 5GC 110 is used as a core network, and may also be referred to as a core network association information element. In other words, in a case that the UE 122 is connected to the EPC, the DRB may be associated with an EPS bearer identity information element (eps-BearerIdentity) in cnAssociation or with an EPS bearer identity corresponding to the value of the EPS bearer identity information element. In a case that the UE 122 is connected to the 5GC 110, the DRB may be associated with an SDAP entity configured in accordance with an SDAP configuration information element (sdap-Config) described below, or a PDU session information element described below and included in the SDAP configuration information element, or a PDU session identity corresponding to the value of the PDU session information element, or a PDU session indicated by the PDU session information element. In other words, the information represented by cnAssociation may include an EPS bearer identity information element (eps-BearerIdentity) in a case that the EPC 104 is used as a core network, such as in a case of using EN-DC, and may include an information element (sdap-Config) indicating an SDAP configuration in a case that the 5GC 110 is used as a core network, in other words, in a case of not using EN-DC.

The information element represented by sdap-Config may be information related to a configuration or reconfiguration of the SDAP entity that determines a mapping method between the QoS flow and the DRB in a case that the 5GC 110 is used as a core network, and may be replaced with an SDAP configuration information element.

A field or an information element included in the SDAP configuration information elements and represented by pdu-session or PDU-SessionID may be the PDU session identity of a PDU session described in NPL 2 and to which the QoS flow mapped to the radio bearer corresponding to the value of the radio bearer identity information element belongs, the radio bearer identity information element being included in the DRB configuration information elements including the present SDAP configuration information element, and may be replaced with a PDU session identity information element. The value of the PDU session identity information element may be an integer that is not negative. Additionally, at each of the terminal apparatuses, multiple DRB identities may correspond to one PDU session identity.

An information element included in the SDAP configuration information elements and indicated by mappedQoSFlowsToAdd may be information indicating a list of QoS flow identity (QFI) information elements described below of QoS flows to be mapped to or additionally mapped to the radio bearer corresponding to the value of the radio bearer identity information element included in the DRB configuration information elements including the present SDAP configuration information elements, and may be replaced with an added QoS flow information element. The QoS flow described above may be a QoS flow of a PDU session indicated by the PDU session information element included in the present SDAP configuration information elements.

An information element included in the SDAP configuration information elements and indicated by mappedQoSFlowsToRelease may be information indicating a list of QoS flow identity (QFI) information elements described below of QoS flows from which a mapping relationship is to be released and which are included in the QoS flows mapped to the radio bearer corresponding to the value of the radio bearer identity information element included in the DRB configuration information elements including the present SDAP configuration information elements, and may be replaced with a released QoS flow information element. The QoS flow described above may be a QoS flow of a PDU session indicated by the PDU session information element included in the present SDAP configuration information elements.

An information element indicated by QFI may be a QoS flow identity described in NPL 2 and uniquely identifying a QoS flow, and may be replaced with a QoS flow identity information element. The value of the QoS flow identity information element may be an integer that is not negative. The value of the QoS flow identity information element may be unique to the PDU session.

Furthermore, the SDAP configuration information elements may include, in addition to the above-described information elements, an uplink header information element indicating whether an uplink SDAP header is present in uplink data transmitted via the configured DRB, a downlink header information element indicating whether a downlink SDAP header is present in downlink data received via the configured DRB, a default bearer information element indicating whether the configured DRB is a default radio bearer (default DRB), and the like.

Information elements included in the SRB configuration information elements and the DRB configuration information elements and represented by pdcp-Config or PDCP-Config may be information elements used to establish or change the PDCP 306 for the SRB and/or the DRB and related to the configuration of an NR PDCP entity, and may be replaced with PDCP configuration information elements. The information elements related to the configuration of the NR PDCP entity include an information element indicating the size of an uplink sequence number, an information element indicating the size of a downlink sequence number, an information element indicating a profile of header compression (RObust Header Compression (RoHC)), a re-ordering timer information element, and the like.

An information element represented by DRB-ToReleaseList and included in the information elements represented by RadioBearerConfig may include information indicating one or more DRB identities to be released.

In FIG. 8, an information element represented by radioResourceConfigDedicated may be an information element used for configuration, change, release, or the like of the radio bearer. An information element represented by SRB-ToAddMod and included in the information elements represented by RadioResourceConfigDedicated may be information indicating a signaling radio bearer (SRB) configuration, and may be replaced with an SRB configuration information element or a signaling radio bearer configuration information element. An information element represented by SRB-ToAddModList may be a list of pieces of information indicating SRB configurations. An information element represented by DRB-ToAddMod and included in the information elements represented by RadioResourceConfigDedicated may be information indicating a data radio bearer (DRB) configuration, and may be replaced with a DRB configuration information element or a data radio bearer configuration information element. An information element represented by DRB-ToAddModList may be a list of pieces of information indicating DRB configurations. Note that any or all of the SRB configurations and the DRB configurations may be referred to as radio bearer configurations.

An information element included in the SRB configuration information elements and represented by SRB-Identity is information of SRB identity of an SRB to be added or changed, and may be an identifier that uniquely identifies the SRB at each terminal apparatus. This information element may be replaced with an SRB identity information element, a radio bearer identity information element, or a signaling radio bearer identity information element. An information element represented by SRB-Identity in FIG. 8 may be an information element having a role identical to the role of the information element represented by SRB-Identity in FIG. 7.

An information element included in the DRB configurations and represented by DRB-Identity may be information of DRB identity of a DRB to be added or changed and may be a DRB identity uniquely identifying, at each terminal apparatus, the DRB. This information element may be replaced with a DRB identity information element, a radio bearer identity information element, or a data radio bearer identity information element. In the example illustrated in FIG. 8, the DRB Identity has an integer value ranging from 1 to 32. However, the DRB identity may take another value. The information element represented by DRB-Identity in FIG. 8 may be an information element having a role identical to the role of the information element represented by DRB-Identity in FIG. 7.

An information element included in the DRB configuration information elements and represented by eps-BearerIdentity may be an EPS bearer identity uniquely identifying an EPS bearer at each terminal apparatus. The information element represented by eps-BearerIdentity may be referred to as an EPS bearer identity information element. In the example illustrated in FIG. 8, the EPS bearer Identity has an integer value ranging from 1 to 15. However, the EPS bearer identity may take another value. The information element represented by eps-BearerIdentity in FIG. 8 may be an information element having a role identical to the role of the information element represented by eps-BearerIdentity in FIG. 7. At each terminal apparatus, the EPS bearer identities may correspond to the DRB identities on a one-to-one basis.

An information element included in the SRB configuration information elements and the DRB configuration information elements and represented by pdcp-Config or PDCP-Config may be an information element related to the configuration of an E-UTRA PDCP entity and used to establish or change the PDCP 206 for the SRB and/or for the DRB, and may be replaced with a PDCP configuration information element. The information elements related to the configuration of the E-UTRA PDCP entity may include an information element indicating the size of the sequence number, an information element indicating the profile of header compression (RObust Header Compression (RoHC)), re-ordering timer information, and the like.

Additionally, some or all of the information elements illustrated in FIG. 7 or FIG. 8 may be optional. In other words, the information elements illustrated in FIG. 7 or FIG. 8 may be included in a message related to the reconfiguration of RRC connection depending on requirements or conditions. In addition, the message related to the reconfiguration of RRC connection may include an information element meaning that a full configuration is to be applied, in addition to an information element related to the configuration of the radio bearer. The information element meaning that the full configuration is to be applied may be represented by an information element name such as fullConfig, and true, enable, or the like may be used to indicate application of the full configuration. Note that the full configuration described above may be applied only at the time of an intra RAT intra system handover described below. For some or all of the handovers other than the intra RAT intra system handover, an information element name such as fullConfig may be used for information elements that mean that no delta configuration is adapted.

EMBODIMENTS

Embodiments of the present invention will be described with reference to FIG. 1 to FIG. 9. In an embodiment of the present invention, processing will be described that is performed in a case that the connection destination RAT of the UE 122 is switched from the first RAT (e.g., NR) to the second RAT (e.g., E-UTRA) different from the first RAT by a handover or the like. Switching of the connection destination core network of the UE 122 from the EPC 104 to the 5GC 110 may refer to switching from the state in which the UE 122 is connected to the EPC 104 via the eNB 102 to the state in which the UE 122 is connected to the 5GC 110 via the eNB 102. Switching of the connection destination core network of the UE 122 from the EPC 104 to the 5GC 110 may refer to switching from the state in which the UE 122 is connected to the EPC 104 via the eNB 102 to the state in which the UE 122 is connected to the 5GC 110 via the gNB 108. Switching of the connection destination core network of the UE 122 from the 5GC 110 to the EPC 104 may refer to switching of the UE 122 from the state in which the UE 122 is connected to the 5GC 110 via the eNB 102 to the state in which the UE 122 is connected to the EPC 104 via the eNB 102. Switching of the connection destination core network of the UE 122 from the 5GC 110 to the EPC 104 may refer to switching of the UE 122 from the state in which the UE 122 is connected to the 5GC 110 via the gNB 108 to the state in which the UE 122 is connected to the EPC 104 via the eNB 102.

Note that in an embodiment of the present invention, in some cases, a handover involving switching of the connection destination core network of the terminal apparatus is referred to as an inter system handover, and a handover involving no switching of the connection destination core network of the terminal apparatus is referred to as an intra system handover. For example, a handover leading to switching of the connection destination core network of the UE 122 from the 5GC 110 to the EPC 104 or from the EPC 104 to the 5GC 110 by a handover may be referred to as an inter system handover. For example, a handover performed with the EPC 104 or the 5GC 110 maintained as the connection destination core network of the UE 122 is referred to as an intra system handover.

In an embodiment of the present invention, in some cases, a handover involving switching of the RAT of the connection destination of the terminal apparatus is referred to as an inter RAT handover, and a handover involving no switching of the core network of the connection destination of the terminal apparatus may be referred to as an intra RAT handover. For example, a handover that switches the connection destination RAT of the UE 122 from the NR 106 to the E-UTRA 100 or from the E-UTRA 100 to the NR 106 may be referred to as an inter RAT handover, and a handover that switches the connection destination RAT of the UE 122 from the NR 106 to the NR 106 or from the E-UTRA 100 to the E-UTRA 100 may be referred to as an inter RAT handover.

In an embodiment of the present invention, a handover involving switching of the connection destination RAT and core network of the terminal apparatus may be referred to as an inter RAT inter system handover, a handover involving switching of the connection destination RAT of the terminal apparatus but no switching of the connection destination core network of the terminal apparatus may be referred to as an inter RAT intra system handover, and a handover involving no switching of the connection destination RAT of the terminal apparatus but involving switching of the connection destination core network of the terminal apparatus may be referred to as an intra RAT inter system handover, and a handover involving no switching of the connection destination RAT and core network of the terminal apparatus may be referred to as an intra RAT intra system handover.

In an embodiment of the present invention, the handover may be performed based on the inclusion, in a message transmitted from the base station apparatus and received by the terminal apparatus and related to the reconfiguration of RRC connection, various parameters related to the handover. The various parameters related to the handover may be information elements named "MobilityControlInfos" described in NPL 4, information elements named ReconfigurationWithSync described in NPL 10, or information elements with another name.

In an embodiment of the present invention, the handover may be performed based on that the terminal apparatus receives, from the base station apparatus, an RRC message indicating mobility from a first RAT to which the terminal apparatus is currently connected (E-UTRA, NR, or the like) to a second RAT (E-UTRA, or NR, or UTRA, or GERAN, or the like) (hereinafter referred to as the message indicating the mobility from the first RAT to the second RAT). The message indicating the mobility from the first RAT to the second RAT described above may be named MobilityFromEUTRACommand described in NPL 4 or MobilityFromNRCommand described in NPL 10 or may have another name. The message indicating the mobility from the first RAT to the second RAT described above may include a message related to the reconfiguration of RRC connection for the second RAT described above.

In an embodiment of the present invention, a source may indicate a handover source, and a target may indicate a handover destination. For example, a source cell may refer to a handover source cell, and a target cell may refer to a handover destination cell. For example, a source base station apparatus may refer to a handover source base station apparatus, and a target base station apparatus may refer to a handover destination base station apparatus.

Figure 5:
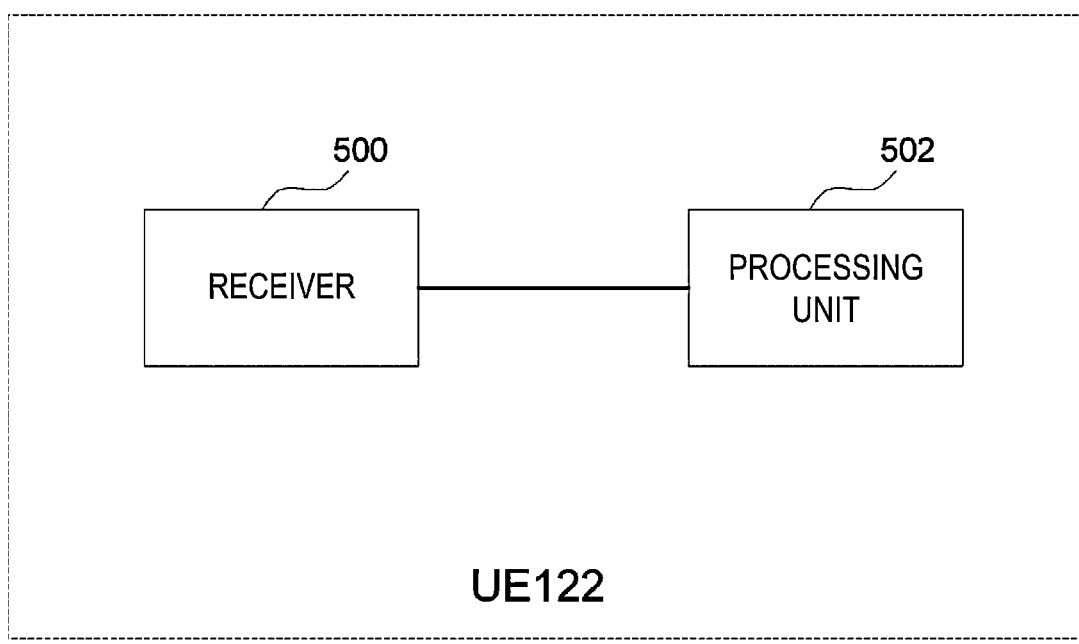
FIG. 5 is a block diagram illustrating a configuration of a terminal apparatus according to each embodiment of the present invention.

FIG. 5 is a block diagram illustrating a configuration of a terminal apparatus (UE 122) according to each embodiment of the present invention. Note that FIG. 5 illustrates only the main components closely related to an aspect of the present invention in order to avoid complexity of description.

The UE 122 illustrated in FIG. 5 includes a receiver 500 configured to receive an RRC message and the like from a base station apparatus, and a processing unit 502 configured to perform processing in accordance with any or all of pieces of configuration information such as various information elements (IEs), various fields, and various conditions included in the message received. The above-described base station apparatus may be the eNB 102 or the gNB 108.

Figure 6:
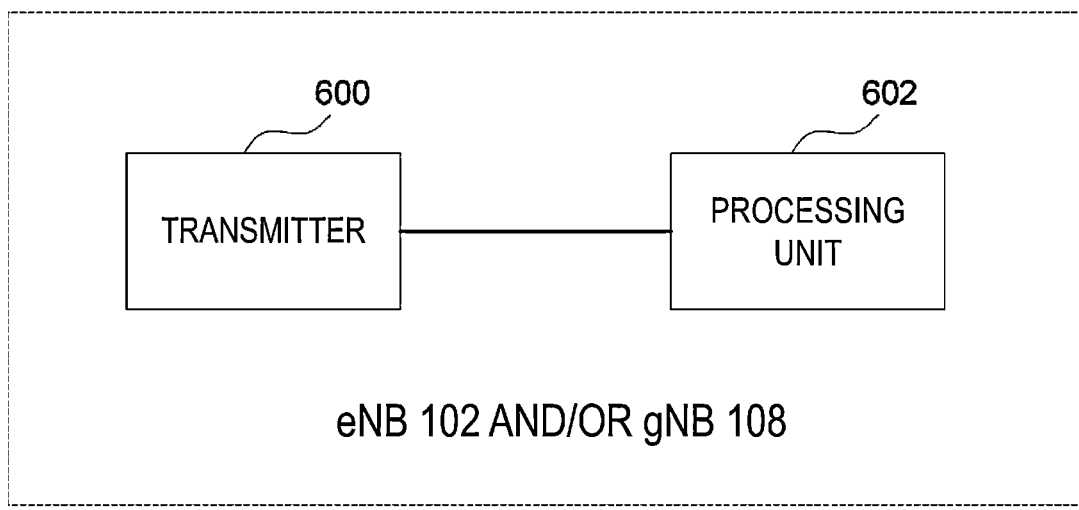
FIG. 6 is a block diagram illustrating a configuration of a base station apparatus according to each embodiment of the present invention.

FIG. 6 is a block diagram illustrating a configuration of the base station apparatus according to each embodiment of the present invention. Note that FIG. 6 illustrates only the main components closely related to one aspect of the present invention in order to avoid complexity of description. The above-described base station apparatus may be the eNB 102 or the gNB 108.

The base station apparatus illustrated in FIG. 6 includes a transmitter 600 configured to transmit an RRC message and the like to the UE 122, and a processing unit 602 configured to create an RRC message including any or all of pieces of configuration information such as various information elements (IEs), various fields, and various conditions and to transmit the RRC message to the UE 122 to cause the processing unit 502 of the UE 122 to perform processing.

An example of the processing method of the UE 122 according to an embodiment of the present invention will be described by using FIG. 9.

The receiver 500 of the UE 122 connected to the first core network via the first RAT receives the message indicating the mobility from the first RAT to the second RAT, the message having been transmitted from the transmitter 600 of the base station apparatus. The first RAT described above may be the NR 106. The first core network described above may be the 5GC 110. The message indicating the mobility from the first RAT to the second RAT may be transmitted by the gNB 108. The second RAT described above may be the E-UTRA 100 (step S900).

The processing unit 502 of the UE 122 performs processing for a handover to the second RAT described above in accordance with the above-described message indicating the mobility from the first RAT to the second RAT (step S902).

The processing unit 502 of the UE 122 may determine a failure in the processing for the handover to the second RAT described above in accordance with the above-described message indicating the mobility from the first RAT to the second RAT, based on satisfaction of conditions including any or all of (A) to (C) described below. Note that conditions for determining a failure in the processing for the handover to the second RAT described above in accordance with the message indicating the mobility from the first RAT to the second RAT described above may include conditions other than (A) to (C) described below. Establishment of connection in (A) described below may refer to establishment of RRC connection (step S904).

(A) Establishment of connection to the second RAT described above fails.

(B) The terminal apparatus fails to comply with any part of the configuration included in the message indicating the mobility from the first RAT to the second RAT.

(C) A protocol error is present in information of the second RAT included in the message indicating the mobility from the first RAT to the second RAT, and the terminal apparatus fails in the processing in the second RAT.

The processing unit 502 of the UE 122 may perform processing for the case of a failure in the processing for the handover to the second RAT described above in accordance with the message indicating the mobility from the first RAT to the second RAT described above, based on the determination of a failure in the processing for the handover to the second RAT described above in accordance with the message indicating the mobility from the first RAT to the second RAT described above (step S906).

In the processing, in step S906, for the case of a failure in the processing for the handover to the second RAT described above in accordance with the message indicating the mobility from the first RAT to the second RAT described above, the processing unit 502 of the UE 122 may revert back to the configuration utilized in the primary cell of the first RAT (source RAT) described above and perform processing for reconnection of a connection before performing the processing for the handover to the second RAT described above in accordance with the message indicating the mobility from the first RAT to the second RAT described above, based on satisfaction of conditions including any or all of (D) to (F) described below. Note that conditions for determination to revert back to the configuration utilized in the primary cell of the first RAT (source RAT) described above and perform processing for reconnection of a connection before performing the processing for the handover to the second RAT described above in accordance with the message indicating the mobility from the first RAT to the second RAT described above may include conditions other than (D) to (F) described below. Establishment of connection in (D) described below may refer to establishment of RRC connection. The reestablishment of connection described above may refer to reestablishment of RRC connection.

(D) Establishment of connection to the second RAT described above fails. The first information is not included in the message indicating the mobility from the first RAT to the second RAT described above.

(E) The terminal apparatus fails to comply with any part of the configuration included in the message indicating the mobility from the first RAT to the second RAT.

(F) A protocol error is present in the information of the second RAT included in the message indicating the mobility from the first RAT to the second RAT, and the terminal apparatus fails in the processing in the second RAT.

In the processing, in step S906, for the case of a failure in the processing for the handover to the second RAT described above in accordance with the message indicating the mobility from the first RAT to the second RAT described above, the processing unit 502 of the UE 122 may select a cell in the second RAT described above or attempt to select a cell in the second RAT based on satisfaction of conditions including (G) described below. Note that conditions for selecting a cell in the second RAT described above or attempting to select a cell in the second RAT described above may include conditions other than (G) described below. Establishment of connection in (G) described below may refer to establishment of RRC connection.

(G) Establishment of connection to the second RAT described above fails. The first information is included in the message indicating the mobility from the first RAT to the second RAT described above.

In the processing, in step S906, for the case of a failure in the processing for the handover to the second RAT described above in accordance with the message indicating the mobility from the first RAT to the second RAT described above, in selecting a cell in the second RAT described above or attempting to select a cell in the second RAT described above, the processing unit 502 of the UE 122 may further determine whether a suitable cell has been selected in the second RAT described above. Based on the determining, by the processing unit 502 of the UE 122, that a suitable cell has been selected in the second RAT described above, the processing unit 502 of the UE 122 may perform processing including some or all of resetting of the MAC, and stoppage of some or all of timers in operation, and discarding of some or all of AS security keys, and release of some or all of radio resources, release of the PDCP entity and/or the SDAP entity for all established radio bearers, and notification of release of RRC connection to the upper layer. Note that the processing for releasing some or all of the radio resources described above may include release of RLC entity, and/or release of the MAC configuration. The processing for releasing some or all of the radio resources described above may include release of the PDCP entity and/or the SDAP entity for all established radio bearers. Note that in a case that the PDCP entity and/or the SDAP entity used in the source RAT is reconfigured and/or reused in the target RAT, the release of the PDCP entity and/or the SDAP entity for all the established radio bearers described above need not be performed. The case where the PDCP entity and/or the SDAP entity used in the source RAT is reconfigured and/or reused in the target RAT described above may refer to the case where delta signaling is used. The case where the delta signaling is used as described above may refer to the case where the full configuration (fullConfig) field is not present in a message related to the reconfiguration of RRC connection for the second RAT described above and included in the message indicating the mobility from the first RAT to the second RAT described above. In notification of release of RRC connection to the upper layer described above, "RRC connection failure" may be configured as a release cause, which may be notified to the upper layer described above, or "else" may be configured as a release cause and notified to the upper layer described above. Any other cause, for example, information meaning that the selection of a cell in the target RAT has been performed may be configured as a release cause and notified to the upper layer described above. The information meaning that the selection of a cell in the target RAT has been performed as described above may be notified to the upper layer described above independently of the processing for notifying the release of RRC connection to the upper layer described above. The selection of a cell in the target RAT described above having been performed may be interpreted as the cell in the target RAT having been prioritized or another expression may be used representing that the selection of a cell in the target RAT has been preferentially performed.

In the processing, in step S906, for the case of a failure in the processing for the handover to the second RAT described above in accordance with the message indicating the mobility from the first RAT to the second RAT described above, in selecting a cell in the second RAT described above or attempting to select a cell in the second RAT described above, the UE the processing unit 502 of the UE 122 may revert back to the configuration utilized in the primary cell of the first RAT described above and perform the processing for reconnection of a connection, based on the determination that no suitable cell has been selected in the second RAT described above.

Note that, "a suitable cell has been selected in the second RAT" may be interpreted as "the selection of a cell in the second RAT has succeeded" or another expression may be used representing that a suitable cell has been selected in the second RAT. Additionally, "no suitable cell has been selected in the second RAT" may be interpreted as "the selection of a cell in the second RAT has not succeeded," "the selection of a cell in second RAT has failed," or the like, or another expression may be used representing that no suitable cell has been selected in the second RAT. Additionally, "no suitable cell has been selected in the second RAT" may be interpreted as "else" for "a suitable cell has been selected in the second RAT." In addition, "a suitable cell has been selected in the second RAT" may be interpreted as "else" for "no suitable cell has been selected in the second RAT."

Note that, in an embodiment of the present invention, the "first information" described above may refer to a parameter (field, and/or information element) indicating the selection of a cell in the second RAT described above to be performed in response to a failure in the establishment of RRC connection to the second RAT described above. The "first Information" described above may be a parameter (field, and/or information element) for indicating the preferential selection of a cell in the second RAT described above to be performed in response to a failure in the establishment of RRC connection to the second RAT described above. The "first information" described above may be any other expression meaning to indicate the preferential selection of a cell in the second RAT described above to be performed in response to a failure in the establishment of RRC connection to the second RAT described above. The "first Information" may be a parameter (field, and/or information element) that means an EPS fallback. The EPS fallback described above may refer to, for example, the EPS fallback described in NPL 2. In other words, the EPS fallback may refer to causing a voice service using IMS to be redirected to the EPS or handed over to the EPS.

Note that a parameter meaning the EPS fallback described above may be included in the message indicating the mobility from the first RAT to the second RAT described above, as second information different from the above-described first information. In the present embodiment, in a case that the second information described above is included in the message indicating the mobility from the first RAT to the second RAT described above, then in step S904 described above, the processing unit 502 of the UE 122 may notify the upper layer described above of a failure in the EPS fallback based on satisfaction of conditions including any or all of (A) to (C) described above. In a case that the second information described above is included in the message indicating the mobility from the first RAT to the second RAT described above, then in step S906 described above, the processing unit 502 of the UE 122 may notify the upper layer described above of a failure in the EPS fallback based on satisfaction of conditions including any or all of (D) and (F) described above. In a case that the second information described above is included in the message indicating the mobility from the first RAT to the second RAT described above, then in step S906 described above, the processing unit 502 of the UE 122 may select a cell in the second RAT described above based on satisfaction of conditions including (G) described above, and may notify the upper layer described above of a failure in the EPS fallback based on the determination that no suitable cell has been selected in the second RAT described above.

Note that the condition may be imposed that the "first information" described above is optionally present only in a case that the second RAT described above is a first, particular RAT and is not present in a case that the second RAT described above is not the first, particular RAT described above. Note that the first, particular RAT described above may be the E-UTRA only or may be an RAT including the E-UTRA, for example, the E-UTRA and the UTRA or the like. The condition may be imposed that the "second information" described above or the "parameter meaning an EPS fallback" is optionally present only in a case that the second RAT described above is a second, particular RAT and is not present in a case that the second RAT described above is the second, particular RAT described above. Note that the second, particular RAT described above may be the E-UTRA only or may be an RAT including the E-UTRA, for example, the E-UTRA and the UTRA or the like.

In an embodiment of the present invention, the user or a network operator may be able to provide configuration as to whether the terminal apparatus receives a voice service using IMS in a case that the terminal apparatus described above has RRC connection to the 5GC 110 established via the gNB. The configuration as to whether the terminal apparatus described above receives a voice service using IMS in a case that the terminal apparatus described above has RRC connection to the 5GC 110 established via the gNB may be provided through an interface of the terminal apparatus or provided on the network operator side not passing through the interface of the terminal apparatus. In a case that with RRC connection established between the terminal apparatus described above and the 5GC 110 via the gNB, in the configuration as to whether the terminal apparatus described above receives a voice service using IMS, disabled reception of the voice service is configured and that the voice service using IMS is transmitted to the terminal apparatus described above, then a transmission source terminal apparatus may be notified that the transmission destination terminal apparatus is disabled to accept the transmission described above. In a case that with RRC connection established between the terminal apparatus described above and the 5GC 110 via the gNB, in the configuration as to whether the terminal apparatus described above receives a voice service using IMS, disabled reception of the voice service using IMS is configured and that the voice service using IMS is transmitted to the terminal apparatus described above, then the terminal apparatus described above (for which disabled reception is configured) may be notified that the voice service using IMS has been transmitted. At this time, the user information of the transmission destination terminal apparatus may also be notified.

Note that, in an embodiment of the present invention, the RRC message including the message related to RRC connection reconfiguration or the message indicating the mobility from the first RAT to the second RAT may be a message indicating mobility from the E-UTRA to the second RAT or may be a message named MobilityFromEUTRACommand described in NPL 4. In an embodiment of the present invention, the RRC message including the message related to RRC connection reconfiguration or the message indicating the mobility from the first RAT to the second RAT may be a message indicating mobility from the NR to the second RAT or may be a message named MobilityFromNRCommand described in NPL 10.

Note that in an embodiment of the present invention, a DRB configuration information element may be a DRB configuration information element in the NR and may be included in the information element named the radioBearerConfig described in NPL 10 or that the DRB configuration information element may be a DRB configuration information element in the E-UTRA and may be included in the information element named radioResourceConfigDedicated described in NPL 4.

In the above description, expressions such as "linked," "mapped", "associated," and the like may be replaced with one another.

Note that in the above description, "A may be interpreted as B" or "A may be B" may include the meaning that B is interpreted as A or that B is assumed as A, in addition to the meaning that A is interpreted as B or that A is assumed as B. In a case that the above description contains "C may be D" and "C may be E," this means inclusion of "D may be E." In a case that the above description contains "F may be G" and "G may be H," this means inclusion of "F may be H."

In the above description, in a case that the condition "A" is opposed to "B," the condition "B" may be expressed as "else" condition for the condition "A".

Thus, in an embodiment of the present invention, the processing may be performed depending on the type of the handover source RAT, the handover destination RAT, the handover source core network, and the handover destination core network of the UE 122. In other words, the terminal apparatus can reduce the complexity of protocol processing and efficiently perform communication.

Note that the terminal apparatus and the method according to each embodiment of the present invention can be, for example, described as follows.

In order to accomplish the object described above, an aspect of the present invention is contrived to provide the following means. Specifically, a terminal apparatus for communicating with a base station apparatus is provided, the terminal apparatus including a receiver configured to receive, from the base station apparatus, a message indicating mobility from a first RAT to a second RAT, and a processing unit to, in handover processing in accordance with the message indicating the mobility from the first RAT to the second RAT, revert back to configuration utilized in a primary cell in the first RAT and perform processing for reconnection of a connection in a case that establishment of connection to the second RAT fails and based on inclusion of no first parameter in the message indicating the mobility from the first RAT to the second RAT, and to, in the handover processing in accordance with the message indicating the mobility from the first RAT to the second RAT, attempt to select a cell in the second RAT in a case that establishment of connection to the second RAT fails and based on inclusion of the first parameter in the message indicating the mobility from the first RAT to the second RAT, and to perform processing including some or all of resetting of MAC, stoppage of some or all of timers in operation, and discarding of some or all of AS security keys, release of some or all of radio resources, and notification of release of RRC connection to an upper layer, based on successful selection of a cell in the second RAT.

An aspect of the present invention is a base station apparatus for communicating with a terminal apparatus, the base station apparatus including a transmitter configured to transmit, to the terminal apparatus, a message indicating mobility from a first RAT to a second RAT, and a processing unit configured to cause the terminal apparatus to, in handover processing in accordance with the message indicating the mobility from the first RAT to the second RAT, revert back to configuration utilized in a primary cell in the first RAT and perform processing for reconnection of a connection in a case that establishment of connection to the second RAT fails and based on inclusion of no first parameter in the message indicating the mobility from the first RAT to the second RAT, and to, in the handover processing in accordance with the message indicating the mobility from the first RAT to the second RAT, attempt to select a cell in the second RAT in a case that establishment of connection to the second RAT fails and based on inclusion of the first parameter in the message indicating the mobility from the first RAT to the second RAT, and to perform processing including some or all of resetting of MAC, stoppage of some or all of timers in operation, and discarding of some or all of AS security keys, release of some or all of radio resources, and notification of release of RRC connection to an upper layer, based on successful selection of a cell in the second RAT.

An aspect of the present invention is a method for a terminal apparatus for communicating with a base station apparatus, the method including receiving, from the base station apparatus, a message indicating mobility from a first RAT to a second RAT, in handover processing in accordance with the message indicating the mobility from the first RAT to the second RAT, reverting back to configuration utilized in a primary cell in the first RAT and processing for reconnection of a connection in a case that establishment of connection to the second RAT fails and based on inclusion of no first parameter in the message indicating the mobility from the first RAT to the second RAT, and in the handover processing in accordance with the message indicating the mobility from the first RAT to the second RAT, attempting to select a cell in the second RAT in a case that establishment of connection to the second RAT fails and based on inclusion of the first parameter in the message indicating the mobility from the first RAT to the second RAT, and performing processing including some or all of resetting of MAC, stoppage of some or all of timers in operation, and discarding of some or all of AS security keys, release of some or all of radio resources, and notification of release of RRC connection to an upper layer, based on successful selection of a cell in the second RAT.

An aspect of the present invention is a method for a base station apparatus for communicating with a terminal apparatus, the method including transmitting, to the terminal apparatus, a message indicating mobility from a first RAT to a second RAT, causing the terminal apparatus to, in handover processing in accordance with the message indicating the mobility from the first RAT to the second RAT, revert back to configuration utilized in a primary cell in the first RAT and perform processing for reconnection of a connection in a case that establishment of connection to the second RAT fails and based on inclusion of no first parameter in the message indicating the mobility from the first RAT to the second RAT, and to, in the handover processing in accordance with the message indicating the mobility from the first RAT to the second RAT, attempt to select a cell in the second RAT in a case that establishment of connection to the second RAT fails and based on inclusion of the first parameter in the message indicating the mobility from the first RAT to the second RAT, and to perform processing including some or all of resetting of MAC, stoppage of some or all of timers in operation, and discarding of some or all of AS security keys, release of some or all of radio resources, and notification of release of RRC connection to an upper layer, based on successful selection of a cell in the second RAT.

In an aspect of the present invention, the first parameter in the terminal apparatus, the base station apparatus, the method for the terminal apparatus, and the method of the base station apparatus refers to a parameter indicating the selection of a cell in the second RAT to be performed in response to a failure in the establishment of RRC connection to the second RAT.

A program running on an apparatus according to an aspect of the present invention may serve as a program that controls a Central Processing Unit (CPU) and the like to cause a computer to operate in such a manner as to implement the functions of the above-described embodiments according to the present invention. Programs or the information handled by the programs are temporarily loaded into a volatile memory such as a Random Access Memory (RAM) while being processed, or stored in a non-volatile memory such as a flash memory, or a Hard Disk Drive (HDD), and then read, modified, and written by the CPU, as necessary.

Note that the apparatuses in the above-described embodiments may be partially enabled by a computer. In such a case, a program for realizing such control functions may be recorded on a computer-readable recording medium to cause a computer system to read the program recorded on the recording medium to perform the program. It is assumed that the "computer system" mentioned here refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiments may be implemented or performed with an electric circuit, that is, typically an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may include a digital circuit, or may include an analog circuit. Furthermore, in a case that with advances in semiconductor technology, a circuit integration technology appears that replaces the present integrated circuits, it is also possible to use an integrated circuit based on the technology.

Note that the invention of the present application is not limited to the above-described embodiments. Although apparatuses have been described as an example in the embodiment, the invention of the present application is not limited to these apparatuses, and is applicable to a stationary type or a non-movable type electronic apparatus installed indoors or outdoors such as a terminal apparatus or a communication apparatus, for example, an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. In addition, a configuration in which components, which are described in the embodiment described above, having similar effects are interchanged is also included in the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

100 E-UTRA
102 eNB
104 EPC
106 NR
108 gNB
110 5GC
112, 114, 116, 118, 120, 124 Interface
122 UE
200, 300 PHY
202, 302 MAC
204, 304 RLC
206, 306 PDCP
208, 308 RRC
310 SDAP
210, 312 NAS
500 Receiver
502, 602 Processing unit
600 Transmitter

The invention claimed is:

1. A terminal apparatus for communicating with a base station apparatus, the terminal apparatus comprising:
a receiver configured to receive, from the base station apparatus, a message indicating handover from a first Radio Access Technology (RAT) to a second RAT; and
processing circuitry, wherein
in a case that processing of the handover in accordance with the message fails,
the processing circuitry is configured to attempt to select a cell in the second RAT based on that a first condition is fulfiled and first information is included in the message, and
the processing circuitry is configured to revert back to a configuration used in a primary cell in the first RAT and perform a connection re-establishment procedure based on that the first condition is fulfilled and the first information is not included in the message, or that a second condition is fulfilled, wherein
the first condition is a failure in establishing a connection to the second RAT, and
the second condition is that the terminal apparatus is unable to comply with any part of a configuration included in the message, and
the first information is information indicating an Evolved Packet System (EPS) fallback for an Internet Protocol (IP) Multimedia Subsystem (IMS) voice service.

2. A communication method for a terminal apparatus for communicating with a base station apparatus, the communication method comprising the steps of:
receiving, from the base station apparatus, a message indicating handover from a first Radio Access Technology (RAT) to a second RAT; and
in a case that processing of the handover in accordance with the message fails,
attempting to select a cell in the second RAT based on that a first condition is fulfiled and first information is included in the message, and
reverting back to a configuration used in a primary cell in the first RAT and performing a connection re-establishment procedure based on that the first condition is fulfilled and the first information is not included in the message, or that a second condition is fulfilled, wherein
the first condition is a failure in establishing a connection to the second RAT, and
the second condition is that the terminal apparatus is unable to comply with any part of a configuration included in the message, and
the first information is information indicating an Evolved Packet System (EPS) fallback for an Internet Protocol (IP) Multimedia Subsystem (IMS) voice service.

* * * * *